United States Patent
Dirga

(10) Patent No.: US 11,887,179 B2
(45) Date of Patent: Jan. 30, 2024

(54) METHODS FOR HOSTING LOCAL TRANSACTIONS BETWEEN SENDERS AND RECIPIENTS

(71) Applicant: Gardeneur, Inc., San Jose, CA (US)

(72) Inventor: Gent Dirga, San Jose, CA (US)

(73) Assignee: Gardeneur, Inc., San Jose, CA (US)

( * ) Notice: Subject to any disclaimer, the term of this patent is extended or adjusted under 35 U.S.C. 154(b) by 0 days.

(21) Appl. No.: 18/104,226

(22) Filed: Jan. 31, 2023

(65) Prior Publication Data
US 2023/0245217 A1    Aug. 3, 2023

Related U.S. Application Data

(60) Provisional application No. 63/359,161, filed on Jul. 7, 2022, provisional application No. 63/304,939, filed on Jan. 31, 2022.

(51) Int. Cl.
*G06Q 30/0601* (2023.01)
(52) U.S. Cl.
CPC ..... *G06Q 30/0639* (2013.01); *G06Q 30/0633* (2013.01); *G06Q 30/0641* (2013.01)
(58) Field of Classification Search
None
See application file for complete search history.

(56) References Cited

U.S. PATENT DOCUMENTS

| | | | | |
|---|---|---|---|---|
| 5,797,113 A | * | 8/1998 | Kambe ................ | G06Q 10/047 340/990 |
| 7,702,545 B1 | * | 4/2010 | Compton ............... | G06Q 30/08 705/26.9 |
| 2002/0130065 A1 | * | 9/2002 | Bloom ..................... | B07C 3/00 209/630 |
| 2003/0018504 A1 | * | 1/2003 | Yamada ................. | G06Q 10/06 705/7.26 |
| 2017/0011449 A1 | * | 1/2017 | Mueller ............. | G06Q 30/0635 |
| 2020/0065746 A1 | * | 2/2020 | Garnepudi ........... | G06Q 10/083 |
| 2020/0357040 A1 | * | 11/2020 | Patel .................... | G06Q 10/087 |

OTHER PUBLICATIONS

Frances Ivens; "Can Amazon repurpose retail space for last-mile logistics? The firm's reported interest in Homebase stores hints at plan to transform retail sites into delivery hubs"; Aug. 24, 2018; UBM Information Ltd (Year: 2018).*

* cited by examiner

*Primary Examiner* — Michelle T Kringen
(74) *Attorney, Agent, or Firm* — Run8 Patent Group, LLC; Peter Miller; Leah Raddatz

(57) ABSTRACT

A method for selecting hubs, such as third-party retail locations, with storage allocated to goods transacted between local recipients and senders. The method further includes generating a listing for a good, within an online marketplace, and associating the listing with a sender hub. Additionally, the method includes aggregating listings associated with sender hubs matched to a recipient hub, presenting the subset of listings to the recipient. When a good is purchased by a recipient, the method includes generating and serving a sender order prompting delivery of the good to the sender hub, generating and serving a hub ticket prompting storage of the good and release of the good to the recipient, and generating and serving a recipient receipt including a prompt to accept delivery of the good.

19 Claims, 6 Drawing Sheets

METHODS FOR HOSTING LOCAL TRANSACTIONS BETWEEN SENDERS AND RECIPIENTS

CROSS REFERENCE TO RELATED APPLICATIONS

This application claims the benefit of U.S. Provisional Application No. 63/304,939, filed on 31 Jan. 2022, and U.S. Provisional Application No. 63/359,161, filed on 7 Jul. 2022, each of which is herein incorporated in its entirety by this reference.

TECHNICAL FIELD

This invention relates generally to the field of local transactions and more specifically to a new and useful method for hosting local transactions between recipients and senders in the field of local transactions.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
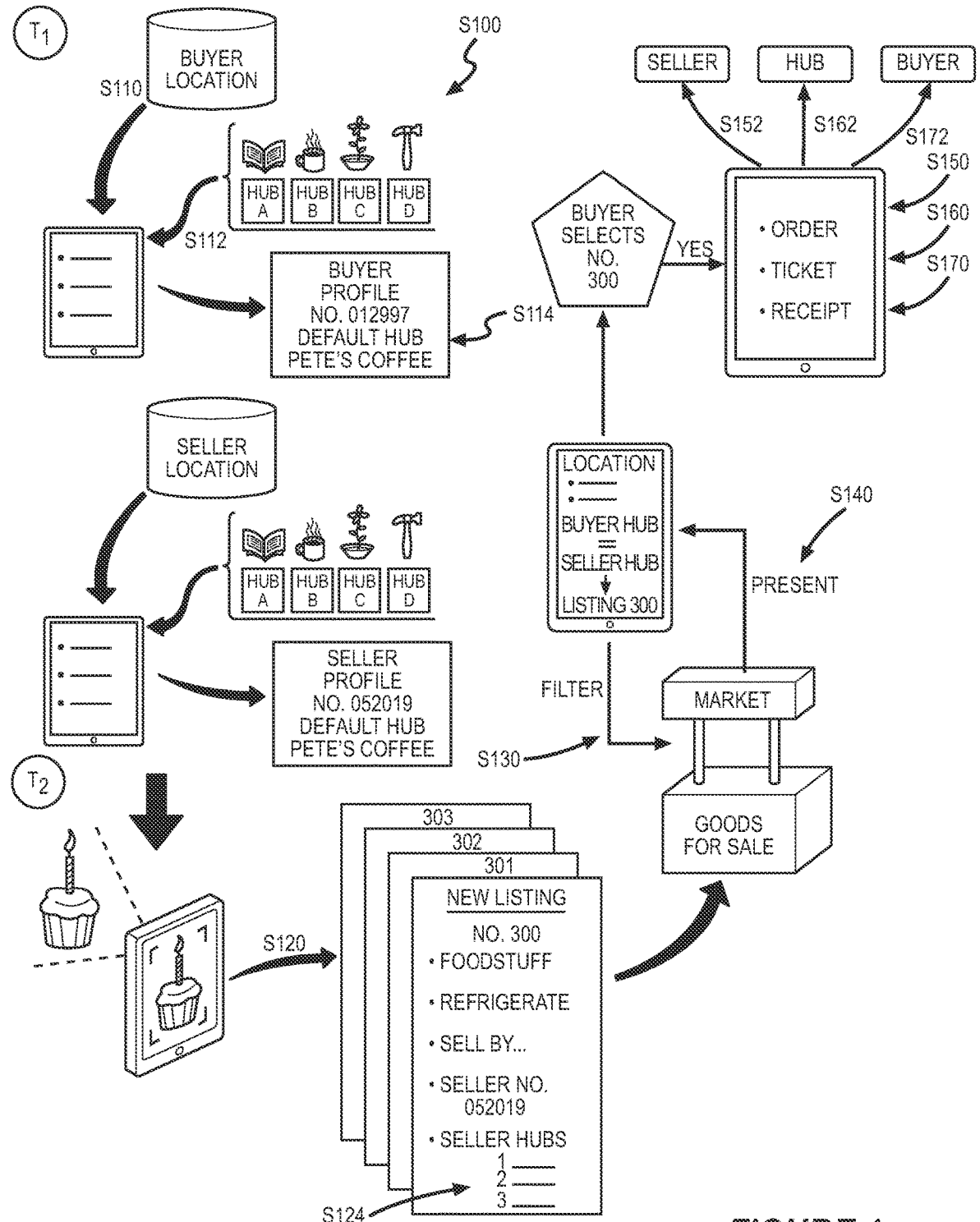
FIG. 1 is a schematic representation of a first method.
Figure 2:
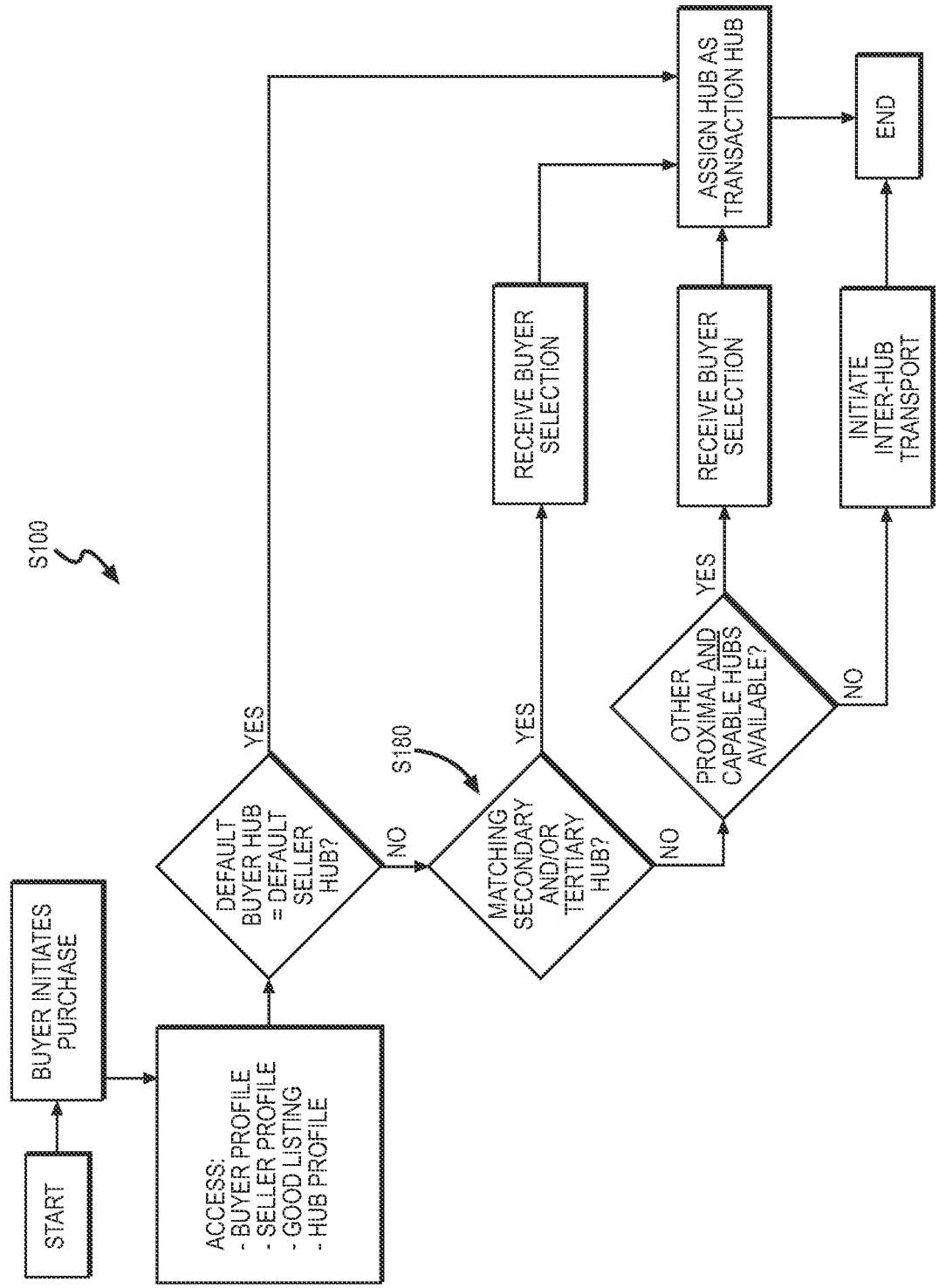
FIG. 2 is a block diagram of one variation of the first method.
Figure 3:
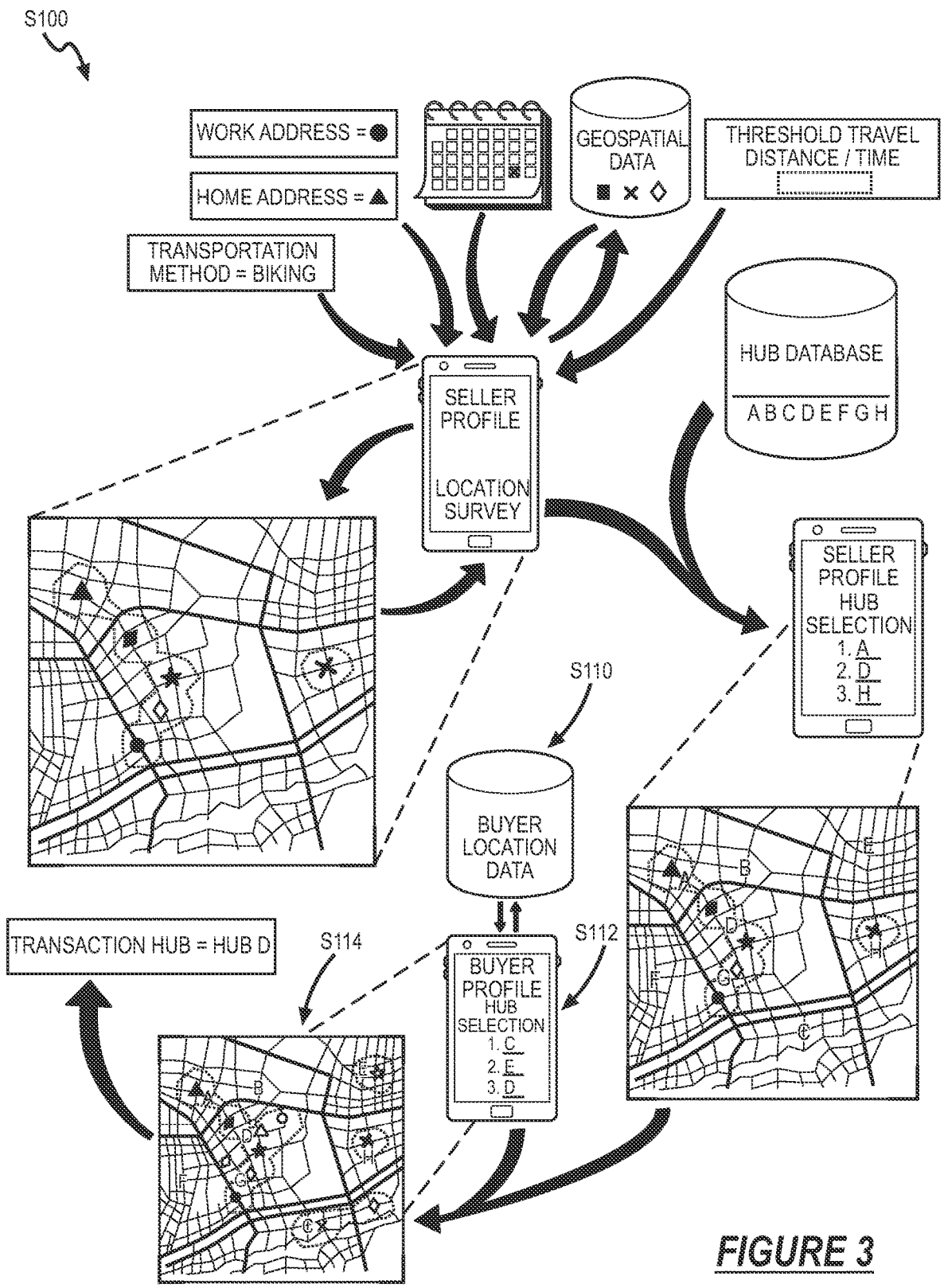
FIG. 3 is a schematic representation of one variation of the first method.
Figure 4:
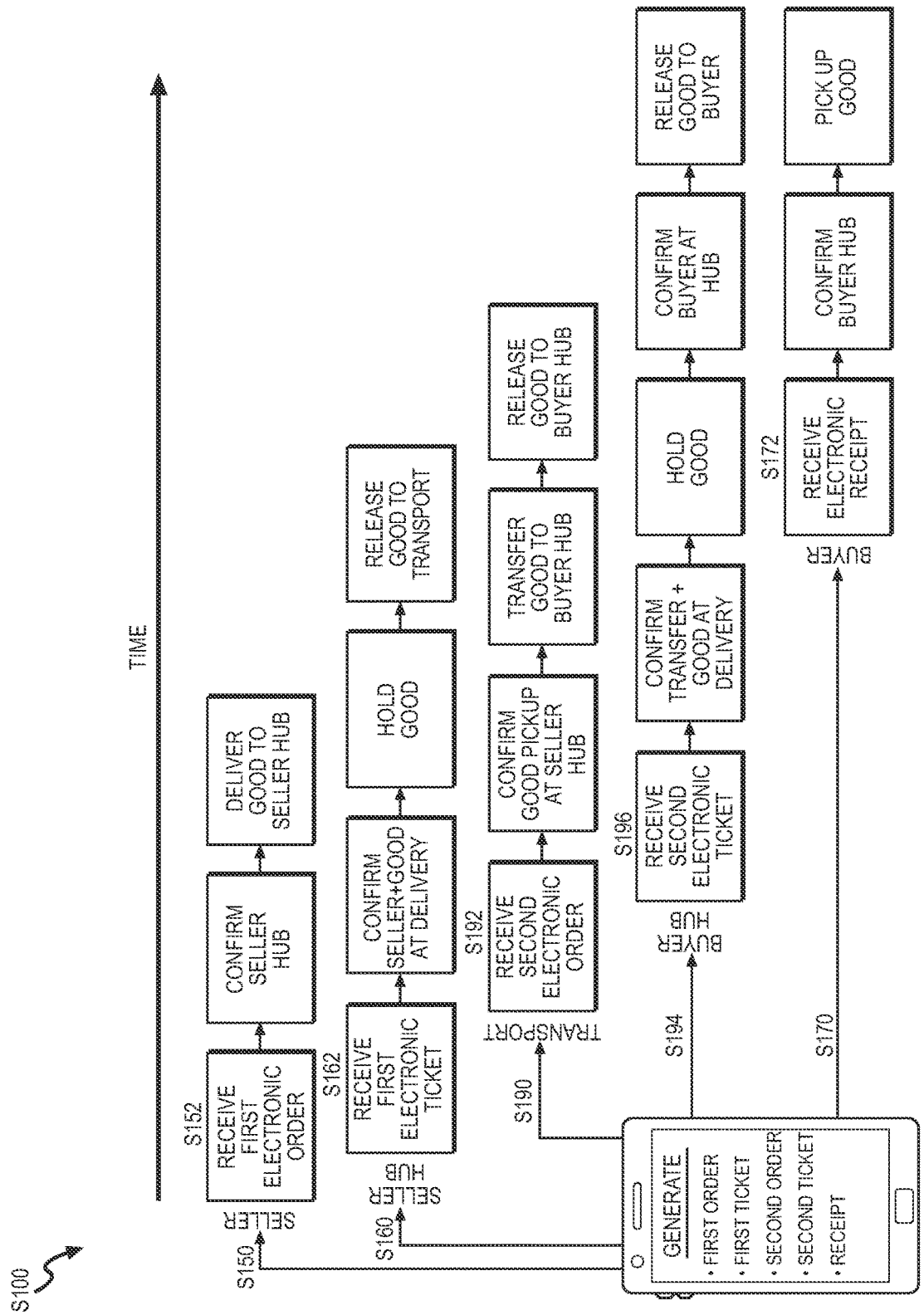
FIG. 4 is a is a schematic representation of one variation of the first method.
Figure 5:
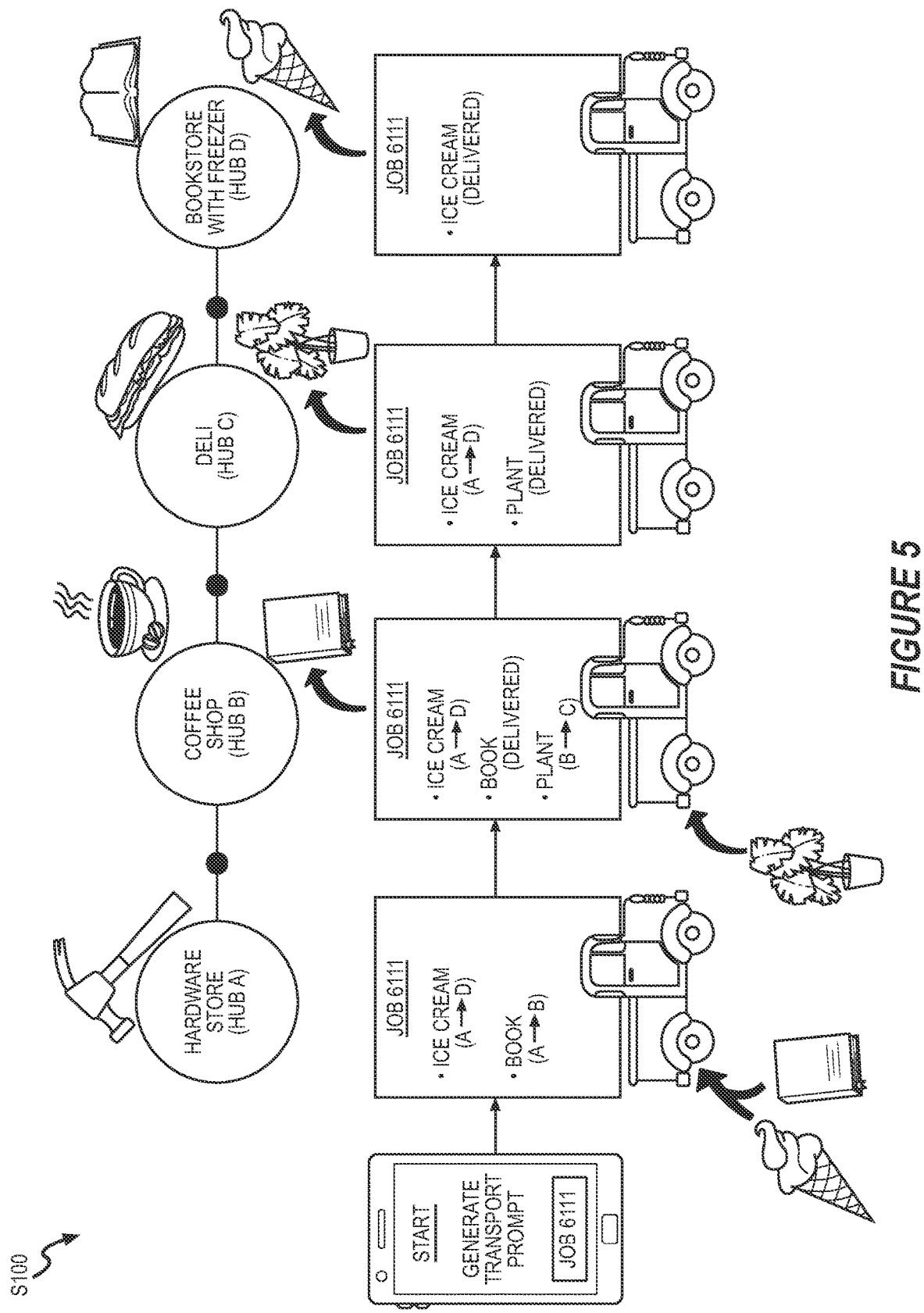
FIG. 5 is a schematic representation of one variation of the first method.

As shown in FIG. 1, a method S100 for hosting local transactions between recipients (e.g., buyers) and senders (e.g., sellers) includes, during a first time period: accessing a first set of locations frequented by a first recipient in Block S110; identifying a first set of hubs, in a population of hubs, proximal the first set of locations in Block S112, each hub in the population of hubs including a third-party retail location (herein referred to as "retail location") with storage space allocated to goods transacted between local recipients and local senders and distinct from goods sold by the third-party retailer, each hub matching a hub profile; and assigning a recipient hub, selected from the first set of hubs, to the first recipient in Block S114.

The first method S100 also includes, during a second time period: generating a first listing, for a first good offered by a first sender, within an online marketplace hosting a population of listings in Block S120; and associating the first listing with a sender hub, in the population of hubs in Block S124.

The first method S100 further includes, during a third time period succeeding the second time period: filtering the population of listings to aggregate a first subset of listings associated with sender hubs matched to the first recipient hub, the first subset of listings including the first listing in Block S130; and presenting the first subset of listings to the first recipient via an online marketplace portal in Block S140.

The first method S100 also includes, in response to the first recipient purchasing the first good, via the first listing, presented in the first subset of listings: generating a first electronic order including a first sender prompt to deliver the first good to the sender hub in Block S150, the sender hub including the recipient hub; serving the first electronic order to the first sender in Block S152; generating a first electronic ticket including a first hub prompt to store the first good and to release the first good to the first recipient in Block S160; serving the first electronic ticket to the sender hub in Block S162; generating a first electronic receipt including a first recipient prompt to accept delivery of the first good at the sender hub in Block S170; and serving the first electronic receipt to the first recipient in Block S172.

One variation of the first method S100 for hosting local transactions between recipients and senders includes, during a first time period: accessing a first set of locations frequented by a first recipient in Block S110; identifying a first set of hubs, in a population of hubs, proximal the first set of locations, each hub in the population of hubs in Block S112; and assigning a first default recipient hub, selected from the first set of hubs, to the first recipient in Block S114.

The variation of the first method S100 also includes, during a second time period: accessing a second set of locations frequented by a first sender; identifying a second set of hubs, in the population of hubs, proximal the second set of locations, each hub in the population of hubs; and assigning a first default sender hub, selected from the second set of hubs, to the first sender.

The variation of the first method S100 further includes, during a third time period, succeeding the first and the second time period, and in response to the recipient purchasing a good and initiating a transaction on a marketplace: accessing a set of inter-hub transport requirements; associating the transaction with inter-hub transport based on the set of inter-hub transport requirements, the default recipient hub, and the default sender hub; generating a first electronic order including a first sender prompt to deliver the first good to the default sender hub in Block S150; serving the first electronic order to the first sender in Block S152; generating a first electronic ticket including a first hub prompt to store the first good and to release the first good to a first transport S160; serving the first electronic ticket to the default sender hub in Block S162; generating a second electronic order including a first transport prompt to pick up the first good at the default sender hub and to deliver the first good to the first default recipient hub in Block S190; serving the second electronic order to the first transport in Block 192; generating a second electronic ticket including a second hub prompt to store the first good and to release the first good to the first recipient in Block 194; serving the second electronic ticket to the first default recipient hub in Block 196; and generating a first electronic receipt including a first recipient prompt to accept delivery of the first good at the first default recipient hub in Block 170; and serving the first electronic receipt to the first recipient in Block 172.

1.1 Applications

Generally, a system (e.g., a computer system or computer network) can execute Blocks of the first method S100 to:

generate profiles for recipients, senders, and hubs engaging in an online marketplace; generate listings for a good being sold by a sender; associate the listings with hubs, within designated proximity thresholds and capable of hosting the goods, which serve as temporary storage sites to store the goods; and coordinate the delivery, storage, and pickup of the transacted good.

In particular, the method S100 can be executed by a computer system—such as in conjunction with a remote computer system and/or mobile device—to: generate recipient profiles, including location data and hub preferences, for purchasing goods from local senders; generate sender profiles allowing senders to list goods in an online marketplace; generate hub profiles with hub storage characteristics that associate good types and storage requirements; receive listings for goods to be uploaded to the online marketplace; filter listings for those available at recipient-selected default hubs, capable of storing the goods; receive requests to purchase goods listed on the online marketplace; coordinate the exchange of the goods at the default hub; notify the sender of their listed goods being purchased; notify the hub of their role in storing the goods; and notify the recipient the goods are prepared for pickup. Therefore, the system can coordinate asynchronous, hyperlocal transactions at hubs proximal locations frequently visited by recipients and senders.

For example, the computer system can: receive a request to generate a recipient profile from a recipient via a recipient portal hosted on a native web application executing on a mobile device associated with the recipient; serve the recipient a location data survey with data fields for location data (e.g., addresses, historical geospatial data, known future locations associated with the recipient's personal calendar, threshold travel distance to a transaction site) to populate the recipient profile; aggregate a grid of common locations based on the recipient location data; access a database of hub profiles associated with hubs in the local population of hubs nearest the recipient; filter the database of hubs to aggregate a subset of hubs proximal the recipient's grid of common locations; present the subset of hubs to the recipient; and receive a selection of a default, secondary, and/or tertiary hub from the recipient to store in the recipient profile. Therefore, the computer system can more effectively coordinate transactions to occur at hubs hyperlocal to the recipient, based on their preferences.

In one implementation, the computer system can access the hub profile associated with the default recipient hub to: isolate a set of hub storage characteristics (e.g., refrigeration, access to light, open hours) associated with the default recipient hub; access the population of listings on the online marketplace to filter for a set of listings where the default recipient hub matches the default sender hub associated with the listing; filter the set of listings to aggregate a subset of listings containing good characteristics associated with the hub storage characteristics of the default recipient hub; present this subset of listings to the recipient via the recipient portal to the online marketplace; and receive a recipient selection to purchase one of the goods associated with the subset of listings. Therefore, the system can present listings that are most convenient for the recipient to purchase and pickup given that the listings are associated with goods that can be stored at the default recipient hub.

In another implementation, the computer system can: receive a recipient request to purchase a listed good; access the listing associated with the good to extract the default sender hub, secondary sender hub, and tertiary sender hub associated with the listing; access the recipient profile to isolate the default recipient hub, secondary recipient hub, and tertiary recipient hub associated with the recipient; and verify that there is an intersecting hub between the recipient preferences and the sender preferences in order to select the hub as a transaction hub. In the instance that no such hub exists, the computer system can then filter the population of hubs to aggregate a list of hubs proximal the grid of common locations associated with the recipient and the grid of common locations associated with the sender. In the instance that there are no such hubs, the computer system can: generate a notification indicating that the transaction will require inter-hub transport; and serve the notification to the recipient via the recipient portal. Upon receiving confirmation to initiate inter-hub transport, the computer system can generate and serve: an electronic order to the sender including a prompt to deliver the good associated with the listing to the default sender hub; and an electronic ticket to a merchant associated with the default sender hub including a prompt to receive and store the good for a limited time and under the hub storage requirements associated with the listing until pickup by a transport.

The computer system can then generate and serve a second electronic order to the transport including: a transport prompt to transfer a good between the default sender hub and the default recipient hub; a route for transport; a latest pickup time; any additional goods to pick up at the default sender hub; and latest delivery time to the default recipient hub. Further, the computer system can generate and serve: a second electronic ticket to the default recipient hub, the prompt including a second hub prompt to store the first good and to release the first good to the first recipient; and an electronic receipt to the sender, the receipt including a latest pickup date. Blocks of the method S100 can enable the computer system to systematically coordinate a transaction to be of maximum convenience to the recipient and sender, while also accommodating transactions between users too distant to connect at a mutually proximal hub by way of optimized inter-hub delivery.

Generally, Blocks of the method S100 are described herein as executed by a computer system, such as a remote computer network or computer server. However, Blocks of the method can be executed by any other computer, computing device, or computer system. Furthermore, the computer system is configured to interface with recipients, senders, and hubs through electronic portals hosted in native applications and/or web browsers executing on mobile devices, such as smartphones, tablets, laptop computers, desktop computers, and/or smart watches, etc.

The event described herein is executed by a computer system to support transactions between recipients and senders on an online marketplace. However, Blocks of the method S100 could be similarly implemented by a computer system to support transactions between recipients and senders in conjunction with an external marketplace or a third-party marketplace. Blocks of the method S100 can enable a computer to integrate into an existing marketplace, operate in conjunction with a marketplace, provide alternative logistical methods for a marketplace, and/or provide logistical methods for transactions not affiliated with a marketplace (e.g., peer to peer transactions, producer to consumer transactions, retailer to consumer transactions), etc.

1.2 Terms

Generally, a "hub" is referred to herein as a physical retail or other publicly accessible space at which a good can be received, stored for a time, and retrieved.

Generally, a "good" is referred to herein as a physical item for resale, capable of being transported by a single individual, either with or without a vehicle.

Generally, a "sender" is referred to herein as a person who completes a transaction for sale of a good with the intention of delivering the good to a hub.

Generally, a "recipient" is referred to herein as a person who completes a transaction for purchase of a good with the intention of retrieving the good from a hub.

Generally, a "transaction" is referred to herein as an exchange of a good between a local sender and local recipient facilitated by the ability to asynchronously host the exchange at a hub.

Generally, a "marketplace" is referred to herein as a platform for the listing, browsing, and purchasing of goods in an online setting.

Generally, a "merchant" is referred to herein as an individual employed by or otherwise affiliated with the operations of a hub.

Generally, a "portal" is an interface for a user to interact with a computer system or online marketplace to provide or receive information via a computing device.

1.3 Hub Onboarding

Generally, the computer can: generate a hub profile for a merchant; onboard the hub profile onto the marketplace; and later assign the hub to a transaction between a recipient and a sender based on characteristics of the merchant stored in the merchant's hub profile.

More specifically, the computer system can interface with a native application or web application—executing on a computing device (e.g., a mobile device, a computer) accessed by the merchant to: receive a request from the merchant to onboard onto the marketplace as a hub; present a survey for hub characteristics to the merchant; to initialize a hub profile for the merchant; and populate the hub profile with hub characteristics collected via the survey. The computer system can then store the hub profile, with a population of hub profiles, in a database of hubs.

In one implementation, the computer system populates the survey with data fields (e.g., dropdown menus, check boxes) for supported good types, such as: foodstuffs requiring refrigeration; foodstuffs not requiring refrigeration; plants requiring refrigeration; plants not requiring refrigeration; plants requiring light exposure; plants requiring watering; durable hard goods (e.g., tool, furniture); fragile hard goods (e.g., ceramic pottery, glassware); and/or soft goods (e.g., clothing). Additionally or alternatively, the computer system can populate the survey with data fields for storage capacity (e.g., shelf area, floor area, refrigeration volume) allocated or allocatable to temporary storage of goods outside of products sold by the merchant. Furthermore, the computer system can populate the survey with data fields for temporal transaction requirements, such as: business hours; preferred or stated drop-off hours for senders; preferred or stated pick-up hours for recipients; and/or maximum good storage duration, such as for all goods delivered or for specific good types (e.g., one-day maximum for refrigerated foodstuffs, two-day maximum for non-refrigerated foodstuffs, four-day maximum for hardgoods). The computer system can further populate the survey with data fields for: locations associated with the merchant and available for onboarding as hubs onto the marketplace; and drop-off and pick-up instructions for senders and recipients transacting at these locations (e.g., check-in with store associate first versus place good directly in specified storage area).

In this implementation, the computer system can then aggregate survey responses supplied by the merchant into a hub profile and load the hub profile into the hub database. The computer system can repeat this process for each hub in the population of hubs.

For example, during a hub setup period, the computer system can: receive a request to generate a hub profile from a first merchant; initialize a first hub survey responsive to the request, the first hub survey including a set of information requests for storage capacity, supported good characteristics, and merchant locations; serve the survey to a computing device associated with the first merchant; extract a first set of hub characteristics from data entered into the survey by the first merchant via the computing device; populate a first hub profile, associated with the first merchant, with the first set of hub characteristics; and store the first hub profile in a hub database containing a population of hub profiles representing the population of hubs.

1.4 Recipient Profile & Recipient Hub Selection

Blocks S110, S112, and S114 of the method recite: accessing a first set of locations frequented by a first recipient; identifying a first set of hubs, in a population of hubs, proximal the first set of locations; and assigning a default recipient hub, selected from the first set of hubs, to the first recipient. Generally, in Block S110, S112, and S114, the computer system can, in response to receiving a request from a user to establish a recipient profile: generate a recipient profile including recipient location data; access the recipient location data; aggregate a first set of locations frequented by the first recipient, based on the location data; filter a hub database for hubs proximal the first set of locations; and assign a default recipient hub to the recipient profile.

More specifically, the computer system can interface with a native application or web application—executing on a computing device (e.g., a mobile device, a computer) accessed by a user to: receive a request from the user to generate a recipient profile; generate a location data survey; and serve the location data survey to the recipient via a recipient portal. The computer system can then: receive the location data survey from the recipient; aggregate a first set of locations frequented by the first recipient from the location data; associate the recipient profile with the first set of locations; filter the hub database for a first subset of hubs proximal the first set of locations; present the subset of hubs to the recipient via the recipient portal; receive a recipient selection of the default recipient hub from the subset of hubs; populate the recipient profile with the default recipient hub; and upload the recipient profile onto the online marketplace. The computer system can repeat this process for all users requesting to generate a recipient profile.

In one variation, the computer system can populate the location data survey with data fields (e.g., text boxes, check boxes, dropdown menus) for permanent location data, such as: work address; home address; zip code; city; frequented retailers (e.g., hardware store, bookstore, butcher, tailor); transportation methods available (e.g., personal vehicle, walking, biking, public transit); and preferred transportation methods. The computer system can further populate the location data survey with data fields (e.g., calendar login portal, calendar upload portal) for planned, future, and/or past events (e.g., work calendar, personal calendar) with affiliated locations. Additionally or alternatively, the computer system can populate the location data survey with data fields (e.g., navigation application login portal) for geospatial location history such as routes previously taken or searched, route frequency, locations visited, and locations searched. Furthermore, the computer system can populate the location data survey with data fields (e.g., interactive maps, text boxes) for hub proximity preferences, such as: threshold travel distance to a hub; threshold travel time to a hub; and travel boundaries.

In this variation, the computer system can: extract location data from the location data survey; aggregate the grid of common locations frequented by the first recipient from the location data; filter the hub database for the first subset of hubs proximal the first set of locations; isolate the first subset of hubs; present the first subset of hubs to the first recipient via the recipient portal; and, upon selection of a default recipient hub from the subset of hubs, populate the recipient profile with the default recipient hub.

In one implementation, a computer system can: access a first set of locations frequented by the first recipient; aggregate a series of geospatial locations of a mobile device associated with the first recipient over a time period, from a location database, into a grid of common locations; and isolate the first set of hubs associated with geospatial locations within a threshold proximity from the grid of common locations.

In one example, the computer system can: access the first set of locations frequented by the first recipient; aggregate the first set of locations; isolate locations attached to future calendar events in the upcoming thirty days associated with the mobile device of the first recipient; isolate locations searched at least twice on the mobile device associated with the recipient; and populate the grid of common locations with the first set of locations. Further, the computer can: isolate the first set of hubs; in response to the recipient selecting the threshold proximity of 0.97 miles, filter the grid of common locations for those which lie within 0.97 miles of address associated with the recipient; and isolate hubs within the first subset of hubs which lie within 0.97 miles of the grid of common locations.

1.4.1 Single Input Hub Selection

In one variation, a computer system can: generate a prompt for the recipient to submit a location (e.g., zip code, city, work address, home address); serve the prompt to the recipient via the recipient portal; receive the location from the recipient; filter the hub database for a subset of hubs within a threshold distance—selected by the recipient—of the location; present the subset of hubs to the recipient for selection of a default recipient hub; receive the default recipient hub selection; and store the default recipient hub in the recipient profile.

In one implementation, the computer system can generate a location data survey including data fields for the recipient to: provide a home address; identify transportation options (e.g., walking, public transit, personal vehicle) available to the recipient; set a threshold travel distance for each of the recipient's transportation options (e.g., 0.25 miles walking, 0.75 miles riding public transit, one mile driving a personal vehicle); set a threshold travel time for each of the first recipient's transportation options (e.g., 10 minutes walking, 20 minutes riding public transit, 15 minutes driving a personal vehicle); and serve the location data survey to the recipient via the recipient portal. The computer system can then, upon manual completion by the recipient: receive the location data survey; extract the location data from the location data survey; and store the location data in the first recipient profile. Furthermore, the computer system can: access the hub database; filter the hub database to aggregate a set of hubs within both the threshold distances and the threshold times of the first recipient home address; serve the recipient the set of hubs via the recipient portal; generate a selection prompt for the recipient to select, a default recipient hub, a secondary recipient hub, and/or a tertiary recipient hub; serve the recipient the selection prompt; receive the recipient selection prompt response; extract the hubs selected by the recipient; and populate the recipient profile with the recipient selections of default recipient hub, secondary recipient hub, and/or tertiary recipient hub.

1.4.2 Multi-Input Hub Selection

In one variation, the computer system can generate a location data survey for the recipient including data fields for: work address; home address; frequented retailers (e.g., coffeeshop, bistro, bookstore, bakery); and locations associated with calendar events (e.g., work calendar, personal calendar). The computer system can then: serve the location data survey to the recipient via the recipient portal; and, upon completion of the location data survey, extract the location data to aggregate a grid of common locations associated with the recipient. Additionally or alternatively, the computer system can aggregate historical geospatial locations of a mobile device associated with the recipient over a time period, from a location database, into the grid of common locations. The computer system can then: filter the hub database for hubs proximal the grid of common locations—including geospatial data and recipient supplied data—to aggregate a set of hubs; serve the set of hubs to the recipient via the recipient portal: receive the recipient selections for a default recipient hub, secondary recipient hub and/or a tertiary recipient hub; and store the hubs selected in the recipient profile.

In one implementation, the computer system can assign the default recipient hub and the secondary recipient hub to the first recipient where the default recipient hub includes a coffee shop and the secondary recipient hub includes a bookstore.

1.4.3 Hub Selection to Meet Hub Storage Requirements

In one variation, a computer system can implement methods and techniques described above: to generate a recipient profile; aggregate a grid of common locations based on location data in the recipient profile; associate the grid of common locations with the recipient profile; prompt the recipient to select a default recipient hub, proximal the grid of common locations, from the population of hubs; and receive the selection of the default recipient hub from the recipient. The computer system can then, in order to fulfill good storage requirements associated with all good types: access the hub database; isolate the hub profile associated with the default recipient hub; extract the hub characteristics from the hub profile; and verify the hub characteristics associated with the default recipient hub.

In one implementation the computer system can access the online marketplace and retrieve a list of good types transacted on the marketplace such as: foodstuffs requiring refrigeration; foodstuffs not requiring refrigeration; plants requiring refrigeration; plants not requiring refrigeration; plants requiring light; plants requiring watering; durable hard goods (e.g., tool, furniture); fragile hard goods (e.g., ceramic pottery, glassware); and soft goods (e.g., clothing, linens). The computer system can then retrieve hub storage requirements for each good type such as: a refrigerator for foodstuffs requiring refrigeration and plants requiring refrigeration; secure storage (e.g., shelf, closet) for fragile hard goods; and a dry environment for soft goods. Further, the computer system can: retrieve hub characteristics (e.g., proximity to the grid of locations associated with the recipient, open hours, good types transacted, hub-specific restrictions, available storage capacity) from the hub database; interface with the recipient to isolate a set of hubs—proximal the grid of common locations associated with the recipient—whose hub characteristics in aggregate fulfill all hub storage requirements associated with all good types; and store the set of hubs with the recipient profile.

In one example a computer system can implement methods and techniques described above to: isolate a list of hubs from the population of hubs proximal the grid of common locations associated with the recipient; select the default recipient hub; and access the hub storage requirements for all good types transacted on the online marketplace. The computer system can then: access the hub profile associated with the default recipient hub; isolate the hub characteristics of the default recipient hub; and verify the hub characteristics to fulfill all hub storage requirements for each good type. Furthermore, the computer system can, upon verifying that the hub characteristics associated with the default recipient hub do not fulfill all hub storage requirements for all good types: filter the list of hubs to aggregate a subset of hubs that fulfill at least one outstanding hub storage requirement; and prompt the recipient—via the recipient portal—to select a secondary hub from the subset of hubs. The computer system can repeat this process until the default hub, secondary hub, tertiary hub, etc. selected by the recipient fulfill all hub storage requirements for all good types.

In another example, the computer system can: retrieve a list of all good types transacted on the online marketplace; isolate a list of hubs from the population of hubs proximal the grid of common locations associated with the recipient; filter the list of hubs to aggregate a subset of hubs that fulfill the hub storage requirements for the first good type; prompt the recipient to select default recipient hub, secondary recipient hub, and tertiary recipient hub—from this subset of hubs—at which to receive goods matching the first good type; and store the selected hubs in the recipient's profile. The computer system can then repeat this process for each other good type until hubs have been selected for all good types on the list of all good types transacted on the online marketplace.

1.5 Sender Profile & Sender Hub Selection

Blocks S120 and S124 of the method recite: generating a first listing, for a first good offered by a first sender, within an online marketplace hosting a population of listings; and associating the first listing with a default sender hub, in the population of hubs. Generally, in Block S120, the computer system can implement methods and techniques described above: to generate a sender profile for a sender; and to populate the sender profile with a default hub, a secondary hub, and/or a tertiary hub, etc. based on the sender's past, current, and/or planned future location(s).

1.6 Generation of Good Listing

Blocks S120 and S124 of the method recite: generating a first listing, for a first good offered by a first sender, within an online marketplace hosting a population of listings; and associating the first listing with a default sender hub, in the population of hubs. Generally, in Blocks S120 and S124, the computer can, in response to receiving a request from a sender to list a good: serve the sender a blank listing; prompt the sender to provide good characteristics associated with the good; generate the listing in online marketplace format; associate the listing with the default sender hub; and publish the good listing to the online marketplace.

More specifically, the computer system can interface with a native application or web application—executing on a computing device (e.g., a mobile device, a computer) accessed by the sender to: receive a request to list a good from the sender; generate a listing; serve the sender the listing including data fields to provide good characteristics; and receive the listing from the sender. The computer system can then: aggregate the good characteristics from the listing; generate the listing in an online marketplace format; associate the listing with the default sender hub; populate the listing with the good characteristics; and publish the good listing to the online marketplace.

In one implementation, the computer system populates the listing with data fields (e.g., text boxes, dropdown menus, check boxes) for good type, such as: foodstuffs requiring refrigeration; foodstuffs not requiring refrigeration; plants requiring refrigeration; plants not requiring refrigeration; plants requiring light exposure; plants requiring watering; durable hard goods (e.g., tool, furniture); fragile hard goods (e.g., ceramic pottery, glassware); and/or soft goods (e.g., clothing, linens). Additionally or alternatively, the computer system can populate the good listing with data fields for hub storage requirements such as: required storage area; access to light (e.g., full-sun, no sun, morning sun, a west-facing window); temperature (e.g., refrigeration, a specific temperature range); ventilation; merchant intervention (e.g., watering); secure storage (e.g., locked cabinet, shelf, closet); and humidity. Furthermore, the computer system can populate the good listing with data fields for: photo uploads; good condition (e.g., new, used, new with tag, missing parts); and earliest delivery time. The computer can: receive the listing from the sender; extract the good characteristics from the listing; aggregate the good characteristics; generate the listing in the online marketplace format; populate the listing with the good characteristics; associate the listing with the sender profile and the default sender hub; and publish the listing to the online marketplace.

In one example, the computer system can: generate the first listing for the first good including a refrigerated foodstuff; and associate the first listing with the default sender hub including a restaurant and the secondary sender hub including the bookstore.

1.6.1 Associating Listings with Hubs

In one implementation, the computer system can: access the first set of good characteristics including a foodstuff type of the first good and a refrigeration requirement of the first good; and filter the second set of hubs for those hubs associated with both refrigeration and foodstuff storage.

In another implementation, the computer system can identify the second set of hubs as hubs: proximal the second set of locations based on merchant locations stored in hub profiles in the population of hub profiles; associated with supported good characteristics, specified in hub profiles in the population of hub profiles, and matched to the first set of good characteristics of first good; and exhibiting available store capacity, specified in hub profiles in the population of hub profiles, to store the first good.

1.7 Good Presentation to Recipient

Blocks S130 and S140 of the method recite: filtering the population of listings to aggregate a first subset of listings associated with default sender hubs matched to the first default recipient hub, the first subset of listings including the first listing; and presenting the first subset of listings to the first recipient via an online marketplace portal. Generally, in Blocks S130 and S140, the computer system can: access the population of listings on the online marketplace; filter the population of listings to aggregate a set of listings with default sender hubs that match the first default recipient hub; and present the set of listings to the recipient via an online marketplace recipient portal.

More specifically, the computer system can interface with a native application or web application—executing on a computing device (e.g., a mobile device, a computer) accessed by the recipient: to filter the population of listings available on the online marketplace to aggregate a set of listings with associated default sender hubs that match the default recipient hub. The computer system can then present the set of listings to the recipient via the recipient portal (e.g., interactive graphic, interactive map, scrollable list). Furthermore, the computer system can: receive a search term (e.g., good type, good name, cost) from the recipient; filter the set of listings to aggregate a subset of listings matched to the search term; and present the subset of listings to the recipient. The computer system can then: receive the recipient's good selection; access the listing associated with the good; extract the default recipient hub associated with the listing; generate a purchase notification including a recipient prompt to confirm the default recipient hub, payment information, and delivery time associated with the good listing; serve the purchase notification to the recipient via the recipient portal; and receive recipient confirmation.

In one implementation, the computer system can: aggregate the first subset of listings; access a population of hubs including geospatial location data for the population of hubs; extract a set of geospatial location data for the population of hubs; populate an interactive display graphic, including an interactive map, with the first subset of listings; and position the first subset of listings on the interactive map, the first subset of listings matched with associated default sender hubs, the population of hubs positioned on the interactive map according to the set of geospatial location data associated with the population of hubs; filter the population of listings to aggregate a second subset of listings associated with default sender hubs within a threshold proximity to the matched default sender hub and the default recipient hub associated with the first listing; populate the interactive map with the second subset of listings, the position of the second subset of listings matched to default sender hubs associated with the second subset of listings; and serve the interactive map to a recipient portal within a native application on a mobile device associated with the first recipient.

1.7.1 Good Filtering—Search Term

In one variation, the computer system can: receive a first search term from the recipient; filter the population of listings for listings associated with the first search term; and aggregate listings, in the population of listings, that match the first search term in the first subset of listings, the first subset of listings including the first good.

1.8 Good Transaction: Matched Recipient+Sender Default Hub

Blocks S150, S152, S160, S162, S170, and S172 of the method recite: generating a first electronic order including a first sender prompt to deliver the first good to the default sender hub matched to the default recipient hub; serving the first electronic order to the first sender; generating a first electronic ticket including a first hub prompt to store the first good and to release the first good to the first recipient; serving the first electronic ticket to the default sender hub; generating a first electronic receipt including a first recipient prompt to accept delivery of the first good at the default sender hub; and serving the first electronic receipt to the first recipient. Generally, in Blocks S150, S152, S160, S162, S170, and S172, the computer system can, upon receiving a recipient selection to purchase a good associated with a listing: generate a purchase order including a sender prompt to deliver the good; serve the order to the sender; generate a ticket including a hub prompt to receive and store the good; serve the ticket to the hub; generate a receipt including a recipient prompt to accept delivery of the good; and serve the receipt to the recipient.

More specifically, the computer system can: receive a recipient selection to purchase a good associated with a listing on the online marketplace; access the population of listings in the online marketplace; isolate the listing selected by the recipient; access the default sender hub associated with the listing to isolate the default sender hub; access the recipient profile to isolate the default recipient hub; and verify the default sender hub and default recipient hub are the same hub. Then, the computer system can: generate an electronic order including a sender prompt to deliver the good to the default sender hub within a given time window (e.g., during business hours at the hub, after a sender selected earliest delivery time, after a recipient selected pickup time); and serve the sender the electronic order—via a sender portal operating on the mobile device associated with the sender. Furthermore, the computer system can generate an electronic ticket including a hub prompt to: confirm the sender identify (e.g., check-in at arrival with good); confirm hub storage requirements (e.g., storage capacity, refrigeration, shelf storage, necessary watering dates by the merchant) associated with the good are available; and verify that the good delivered is the good associated with the listing (e.g., photo confirmation). The computer system can then serve the electronic ticket to the hub via a computing device associated with the hub profile. Upon delivery of the confirmed good to the default sender hub by the sender, the computer system can: generate an electronic receipt including a recipient prompt to accept delivery of the good at the default recipient hub and collect the good within a given time window (e.g., prior to latest available pickup date); and serve the electronic receipt to the recipient via a mobile device associated with the recipient.

For example, the computer system can: generate the first listing for the first good, the first good a potted houseplant; associate the first listing with the default sender hub including a coffee shop; and generate the first electronic ticket including the first hub prompt to store the potted houseplant in a storage area, at the default sender hub, and exposed to natural light.

1.8.1 Time Limits

Generally, the computer system can access a maximum storage duration of goods temporarily stored at a hub and generate a prompt for both recipients and senders including latest delivery dates and latest pickup times.

In one implementation, a computer system can: access a maximum storage duration of goods temporarily stored at the default sender hub, transacted between local recipients and local senders, and distinct from goods sold by the third-party retailer; and generate the first electronic order including the first sender prompt to deliver the first good to the default sender hub prior to a latest delivery date. The computer system can then: generate the first electronic receipt; calculate a latest pickup date based on a combination of latest delivery date and the maximum storage duration; and generate the first recipient prompt to pick up the first good prior to the latest pickup date.

1.8.2 Matching Hubs Through Good Characteristics

In one implementation, a computer system can: access a second set of locations accessible to the first sender; identify a second set of hubs, in the population of hubs, proximal the second set of locations, each hub in the population of hubs including a third-party retail location further associated with supported good characteristics of goods transacted between local recipients and local senders and temporarily stored by the hub; isolate a subset of hubs, in the second set of hubs, associated with supported good characteristics including the first set of good characteristics of first good; and assign the default recipient hub, selected from the subset of hubs, to the first listing.

1.9 Determining a Transaction Hub

Block S180 of the method recites: selecting a first transaction hub from a set of hubs including the default sender hub and the secondary sender hub.

Generally, in Block S180 the computer system can implement methods and techniques described above to: generate a recipient profile for a recipient and a sender profile for a sender, both profiles including a default hub, a secondary hub, and/or a tertiary hub, and a grid of common locations based on the recipient's or sender's past, current, and/or planned future location(s); generate hub profiles, stored in the hub database, associated with hubs in a population of hubs and populated with hub characteristics; generate a listing including hub storage requirements associated with a good; and receive a recipient selection to purchase a good. The computer system can: access the listing associated with the good; isolate the hub storage characteristics associated with the good, from the listing; filter the previously selected default hubs associated with both the recipient and the sender using the hub storage characteristics to aggregate a subset of hubs; present the subset of hubs to the recipient, the subset of hubs including hubs proximal the recipient and/or sender and capable of storing the good; and receive a selection of a transaction hub by the recipient, from the subset of hubs.

In one variation in which a listing is associated with a default sender hub that does not match the default recipient hub, a computer system can: access the population of listings on the online marketplace; and filter the population of listings to isolate listings in which the secondary sender hub and/or the tertiary sender hub associated with the listing match the default recipient hub. Additionally or alternatively, the computer system can: access the population of listings on the online marketplace; and filter the population of listings for listings in which the secondary recipient hub and/or the tertiary recipient hub match the default sender hub associated with the listing. Then, the computer system can: isolate a subset listings where there is at least one intersection of hubs between the recipient and sender hub preferences; aggregate the hub profiles associated with the subset of listings to a subset of hub profiles; present the subset of hub profiles to the recipient; receive a selection for a transaction hub, for which the transaction hub is associated with one of the hub profiles in the subset of hub profiles.

In one implementation, the computer system can: identify the first set of hubs in the population of hubs, within a recipient threshold distance of the first set of locations frequented by the recipient; associate the first listing with the default sender hub and the secondary sender hub; identify a second set of hubs, in the population of hubs, within a sender threshold distance of the locations frequented by the recipient, the second set of hubs including the default sender hub and the secondary sender hub; and associate the first listing with the second set of hubs.

1.9.1 Second Transaction at Default Sender Hub

For example, the computer system can, during the first time period, assign a secondary recipient hub, selected from the first set of hubs, to the first recipient. The computer system can then, during a fourth time period: generate a second listing, for a second good offered by a second sender, within the online marketplace hosting the population of listings; and associate the second listing with a second default sender hub in the population of hubs. Furthermore, the computer system can, during a fifth time period, succeeding the fourth time period: filter the population of listings to aggregate a second subset of listings associated with default sender hubs intersecting the first default recipient hub and the secondary recipient hub, the second subset of listings including the second listing; and present the second subset of listings to the first recipient via the online marketplace portal. The computer system can, in response to the first recipient purchasing the second good, via the second listing, presented in the second subset of listings: generate a second electronic order including a second sender prompt to deliver the second good to the second default sender hub, the second default sender hub including the secondary recipient hub; serve the second electronic order to the second sender; generate a second electronic ticket including a second hub prompt to store the second good and to release the second good to the first recipient; serve the second electronic ticket to the second default sender hub; generate a second electronic receipt including a second recipient prompt to accept delivery of the second good at the second default sender hub; and serve the second electronic receipt to the first recipient.

1.9.2 Second Transaction at Default Recipient Hub

In another example, the computer system can, during a fourth time period: generate a second listing, for a second good offered by the first sender, within the online marketplace hosting the population of listings; and associate the second listing with the default sender hub and a secondary default sender hub, in the population of hubs. The computer system can then, during a fifth time period succeeding the fourth time period: filter the population of listings to aggregate a second subset of listings associated with default recipient hubs intersecting the first default sender hub and a second default sender hub, the second subset of listings including the second listing; and present the second subset of listings to the first recipient via an online marketplace portal. Furthermore, the computer system can, in response to the first recipient purchasing the second good, via the second listing, presented in the second subset of listings: generate a second electronic order including a second sender prompt to deliver the second good to the default recipient hub; serve the second electronic order to the first sender; generate a second electronic ticket including a second hub prompt to store the second good and to release the second good to the first recipient; serve the second electronic ticket to the default recipient hub; generate a second electronic receipt including a second recipient prompt to accept delivery of the second good at the default recipient hub; and serve the second electronic receipt to the first recipient.

1.9.3 Intersecting Hub as the Transaction Hub

In one example, the computer system can: assign the default recipient hub, a coffee shop, and the secondary recipient hub, a bookstore, to the first recipient; associate the first listing with the default sender hub and the secondary sender hub, where the default sender hub is a restaurant and the secondary sender hub is the bookstore; and select the first transaction hub as the bookstore.

1.9.4 Hub Compatibility Determines Transaction Hub

In one variation, during the third time period succeeding the second time period, the computer system can: access a set of good characteristics of the first good; access the first set of good characteristics includes accessing the first subset of listings; filter the first subset of listings for the first listing wherein the first listing includes the first good; and aggregate the good characteristics associated with the first good from the first listing into a first set of good characteristics including a foodstuff class associated with the first good, and a refrigeration requirement associated with the first good. The computer system can then: access a set of hub characteristics of each hub associated with the list of hubs, the list of hubs including the default recipient hub, the secondary recipient hub, the default sender hub, and the secondary sender hub; access a hub profile for each of the hubs in the list of hubs; aggregate a set of hub characteristics from the hub profiles associated with each hub in the list of hubs; and filter the list of hubs for hubs associated with hub characteristics including available refrigeration, and foodstuff storage. Furthermore, the computer system can: select the first transaction hub from a set of hubs; present the filtered list of hubs to the recipient; and receive a manual recipient selection from the list of hubs, the selection including the hub transaction hub associated with hub characteristics matched to the good characteristics associated with the first good.

1.11 Inter-Hub Transport

Generally, Blocks S190, S192, S194, and S196 of the method recite: generating a second electronic order including a first transport prompt to pick up the first good at the default sender hub and to deliver the first good to the default recipient hub; serving the second electronic order to the first transport; generating a second electronic ticket including a second hub prompt to store the first good and to release the first good to the first recipient; and serving the second electronic ticket to the default recipient hub.

Generally in Blocks S190, S192, S194, and S196 the computer system can: generate a second electronic order including a first transport prompt to pick up the first good at the default sender hub and to deliver the first good to the default recipient hub; serve the second electronic order to the first transport; generate a second electronic ticket including a second hub prompt to store the first good and to release the first good to the first recipient; and serve the second electronic ticket to the default recipient hub.

More specifically, the computer system can implement methods and techniques described above to generate: a recipient profile for a recipient and a sender profile for a sender, both profiles including a default hub, a secondary hub, and/or a tertiary hub; and a grid of common locations based on the recipient's or sender's past, current, and/or planned future location(s). In response to receiving a recipient selection to purchase a good associated with a listing, the computer system can: access the listing; extract the default sender hub, secondary sender hub, and tertiary sender hub associated with the listing; and filter the hub database for a first subset of hubs associated with the recipient (e.g., default recipient hub, secondary recipient hub, tertiary recipient hub) that also intersect the hubs associated with the listing. If no such hubs exist, the computer system can: access the recipient profile; extract the hub proximity preferences (e.g., threshold travel time, threshold travel distance) associated with the recipient; access the sender profile; extract the hub proximity preferences (e.g., threshold travel time, threshold travel distance) associated with the sender; and filter the database of hubs for a second subset of hubs, not associated with either the sender profile or recipient profile (e.g., default recipient hub, default sender hub, etc.), that intersect the hub proximity preferences of both the recipient and sender. If no such hubs exist, the computer system can: generate a notification indicating the transaction has met a set of inter-hub transport requirements (e.g., recipient and sender default, secondary, and tertiary hubs do not intersect; no intersecting hubs meet the hub storage requirements; no other hubs which meet hub storage requirements intersect the threshold proximities between the recipient and the sender); and serve the notification to each of the recipient, sender, default recipient hub, and default sender hub via mobile devices associated with their respective online marketplace profiles.

Furthermore, upon receiving confirmation of good delivery to the default sender hub by the sender, the computer system can: generate a second electronic order including a first transport prompt to pick up the first good at the default sender hub and to deliver the first good to the default recipient hub; serve the second electronic order to the first transport; generate a second electronic ticket including a second hub prompt to store the first good and to release the first good to the first recipient; and serve the second electronic ticket to the default recipient hub.

1.10.1 Ticketing Inter-Hub Transport

In one variation in which inter-hub transport is necessary to complete a transaction, the computer system can implement methods and techniques described above to: generate a purchase order including a sender prompt to deliver the good; serve the order to the sender; generate a ticket including a hub prompt to receive, store, and release the good; serve the ticket to the transaction hub; generate a receipt including a recipient prompt to accept delivery of the good; and serve the receipt to the recipient. Furthermore, the computer system can generate a second electronic order including: a transport prompt to transfer a good between the default sender hub and the default recipient hub; a route for transport; a latest pickup time; any additional goods to pick up at the default sender hub; and latest delivery time to the default recipient hub. Then, the computer system can: generate a second electronic ticket including a second hub prompt to store the first good and to release the first good to the first recipient; and serve the second electronic ticket to the default recipient hub.

1.11 Transaction Completion

In one variation, during the finalization of a transaction, the computer system can, during the third time period succeeding the second time period: hold a sum of funds associated with the first recipient and the first listing in a recipient trust account; upon serving the first electronic receipt to the first recipient, automatically generate a good confirmation request including a second recipient prompt to confirm quality and condition of the first good as previously described in the first listing upon pick-up at the default sender hub; upon serving the first electronic receipt to the first recipient, automatically generate a hub confirmation request including a second hub prompt to confirm pick-up of the first good at the default sender hub and completion of the good confirmation request by the first recipient; serve the good confirmation request to the first recipient; serve the hub confirmation request to the default sender hub; and, upon receiving the good confirmation request from the first recipient and the hub confirmation request from the default sender hub, release funds from the recipient trust to a sender account associated with the first sender.

In one example, the computer system can: receive the good confirmation request from the first recipient indicating the foodstuff is whole and prior to its expiration date; receive the hub confirmation request from the default sender hub indicating user-6111 submitted the good confirmation request and completed pick-up of the foodstuff; and release $23.07 from the first recipient trust to the sender account.

As a person skilled in the art will recognize from the previous detailed description and from the figures and claims, modifications and changes can be made to the embodiments of the invention without departing from the scope of this invention as defined in the following claims.

2. Second Method

Figure 6:
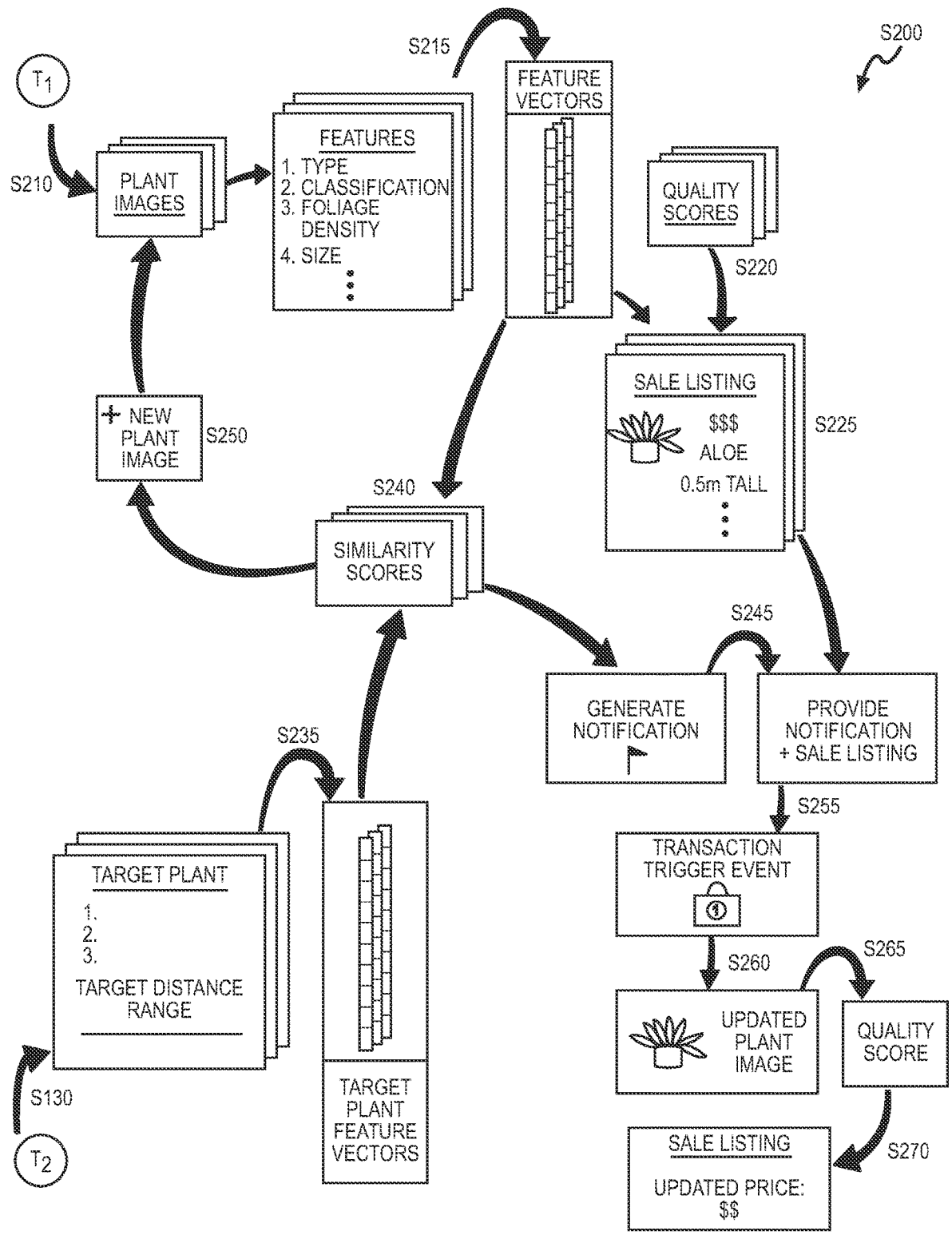
FIG. 6 is a schematic representation of one variation of a second method.

As shown in FIG. 6, a second method S200 includes: at a first time, accessing a first image of a first plant in Block S210; extracting a set of characteristics from the first image descriptive of characteristics of the first plant and a sender location to populate a first feature vector associated with the first plant in Block S215; calculating a first quality score based on the set of characteristics in the first feature vector descriptive of a quality of the first plant as captured in the image in Block S220; generating a first sale listing including the set of characteristics and the first quality score in Block S225; at a second time, accessing a set of target characteristics for a target plant including a set of target features and a target location, the set of target characteristics selected by a recipient in Block S230; generating a second feature vector associated with the target plant based on the set of target characteristics in Block S235; computing a difference between the first feature vector and the second feature vector to generate a similarity score in Block S24o; in response to the similarity score exceeding a similarity threshold, pushing a notification to the recipient that the target plant is available and providing the sale listing corresponding to the second feature vector to the recipient in Block S245; in response to the similarity score falling below the similarity threshold, querying the sale listings after an interval of time to identify a third feature vector corresponding to a third sale listing in Block S250; monitoring for a transaction trigger event associated with the first sale listing in Block S255; in response to detecting the transaction trigger event, accessing a second image of the first plant in Block S260; calculating a second quality score based on the set of characteristics in the second image in Block S265; and adjusting a demand score of the sale listing based on a change between the first quality score and the second quality score in Block S270.

2.1 Applications

Generally, a system (e.g., a computer system, a computer network) can execute Blocks of the second method S200: to generate sale listings for plants based on images of plants provided by a population of senders; to identify characteristics specifying a target plant; to query sale listings for matches between a sale listing and target characteristics for a recipient; to coordinate delivery of a target plant identified in the sale listing to an intermediate holding location; and to notify the recipient of availability of the target plant at the intermediate holding location.

In particular, the system can execute Blocks of the second method S200 to: initialize sale listings—on a digital platform—for plants owned by a population of local senders, such in individual homeowners, renters, and local small-scale growers; to detect and/or record characteristics of these individual plants, such as plant type (e.g., a genus and species), size, and quality entered manually by senders or extracted automatically from images of plants by the system; to suggest pricing based on the characteristics and historical listing data; to aggregate a subset of these sale listings corresponding to a particular geographic region occupied by a particular recipient; to filter this subset of these sale listings based on characteristics of the recipient (e.g., plant expertise, plant interest, plant care availability); to present this filtered subset of sale listings to the particular recipient on a digital marketplace; to present; to schedule a sender to deliver a particular plant—corresponding to a particular sale listing selected from this filtered subset of sale listings by the user or by the system on behalf of the user—to an intermediate holding location (e.g., a contracted café or restaurant) near the particular recipient's location or commonly-traversed routes; and to support subsequent handoff of the particular plant from the intermediate holding location to the particular recipient. The system can concurrently execute this process to host plant transactions between local senders, intermediate holding locations, and recipients for multiple (e.g., many) plants over time.

In one implementation, the system can: initialize a sale listing for a plant offered by a sender located at a particular sender location; access an image of the plant (e.g., uploaded by the sender); extract a set of features from the image; and identify characteristics of the plant—such as plant type (e.g., a genus and a species), plant health, size, heartiness, presence of pests, damage (e.g., type and/or magnitude)—based on the set of features extracted from the image of the plant. The system can then: write these characteristics and the corresponding image to the sale listing; link the sale listing to the sender and the sender location (e.g., specified by the sender); and publish the sale listing to a purchase platform. The system can thus repeat this process for many senders over time—and at many sender locations—to retrieve images of plants (e.g., uploaded by a sender of the plant) and implement computer vision techniques (e.g., image classification, object detection, etc.) to extract features from these images and label the data. Therefore, the system can reduce errors associated with acquiring information for the sale listing by implementing computer vision techniques rather than relying on visual cues and observations made by a human (e.g., the sender).

In one implementation, the system can pull sale listings from senders by searching a library of available sale listings to identify a target plant for a recipient and initiate a transaction for the target plant. For example, the system can: query a set of available sale listings exhibiting a set of characteristics descriptive of a plant in the corresponding sale listing, generate a comparison between the target plant vector and the set of feature vectors corresponding to sale listings to identify a match, and in response to identifying that the target plant vector is similar to a feature vector for a sale listing relative to a similarity score threshold, and select the sale listing associated with the sender. Therefore, the system can more effectively promote transactions of plants sourced from senders by identifying target plants from sale listings that are made available by the senders and align with preferences of recipients.

In another implementation, the system can push listings to recipients based on stored recipient interests, locations, plant preferences, etc. In this implementation, the system can generate a notification that a sale listing including the set of target characteristics has been identified and push the notification to the recipient. For example, the system can: generate a comparison between the target plant vector and the set of feature vectors corresponding to sale listings to identify a match, and in response to identifying that the target plant vector is similar to a feature vector for a sale listing relative to a similarity score threshold, push a recommendation for the sale listing to the user. Therefore, the system can more effectively provide recommendations to recipients for plants based on individual target characteristics rather than a recipient browsing through most or all of the available sale listings and searching for a match.

In one implementation, the system can monitor change in plant quality over time—such as between posting of a sale listing for a particular plant and execution of a final transaction associated with sale of the plant—based on images of the plant over time. More specifically, the system can: characterize a quality score for a plant—representative of quality of the plant during a particular time period—based on characteristics (e.g., plant type, health, age, damage) of the plant derived from an image of the plant recorded during the particular time period; and update this quality score over subsequent time periods based on characteristics of the plant derived from images of the plant recorded during these subsequent time periods. The system can therefore update the sale listing and/or description for this particular plant over time to reflect changes in plant quality—such as improvement (e.g., growth, rehydration, increased foliage, flowering) and/or deterioration (e.g., loss of leaf foliage, wilting, dehydration, discoloration) in plant quality—due to storage conditions (e.g., improper or optimal storage conditions), environmental conditions, and/or plant care (e.g., watering, altering environment temperature, altering humidity levels, application of fertilizer) implemented by the sender and/or plant caretaker. Therefore, the system can modify sale listings to reflect a current state of the plant and report changes (e.g., decreases) in the quality of the plant during the time that the sale listing is published for advertisement.

Further, the system can leverage known plant characteristics—in combination with the sender location (e.g., specified by a sender of the plant) and/or a recipient location (e.g., specified by a recipient of the plant)—to select a particular holding location for the plant between initial purchase of the plant and collection of the plant by the recipient. In particular, upon confirmation of a purchase of the plant by a recipient, the system can select a holding protocol for the plant—such as a magnitude of sun exposure, a storage temperature range, a storage humidity range, a watering frequency, a fertilizing frequency, a type of environment, space availability, etc. —for a holding period between a time of purchase of the plant and a time of retrieval of the plant by the recipient, based on characteristics (e.g., type, age, health) of the plant. The system can then: retrieve a sender location associated with a sender of the plant; retrieve a recipient location associated with the recipient; and, based on the sender location, the recipient location, and the holding protocol, select a particular holding location for the plant during the holding period. Therefore, rather than store these plants at a generic warehouse or storage lockbox which may be unsuitable for the plant, the system can select a holding location tailored to characteristics of this particular plant—thereby limiting damage (e.g., broken leaves, broken branches, wilting, discoloration of leaves, deterioration of plant health) incurred to the plant during the holding period, such as due to plant sensitivity to temperature, moisture level, light, sun exposure, humidity, watering and/or feeding frequency, etc. —and tailored to both the recipient and sender locations, thereby minimizing inconvenience to the recipient and sender of the plant.

Therefore, the system can execute Blocks of the second method S200 to: host a local marketplace for plant transactions by automating custom sale listings for plants from local senders and distributors; match plants to recipients based on target plant characteristics; select intermediate holding locations based on a plant care protocol corresponding to the plants; and coordinate deliveries for plants to intermediate holding locations on behalf of recipients and senders based on recipient locations and location preferences, sender locations, available local intermediate holding locations, and characteristics of the local intermediate holding locations.

2.2 Sale Listing

Generally, the system can interface with a user (e.g., a sender) to generate and post listings of plants on the digital marketplace for purchase by local recipients. In one implementation, the system can aggregate a set of characteristics descriptive of a plant, generate a sale listing for the plant based on the set of characteristics, and post the sale listing for the plant to a platform (e.g., a website, an application, etc.). More specifically, the system can receive an input for a set of characteristics such as—plant classification (e.g., a Genus, a Species, etc.), an image of the plant, a date of posting, a foliage density, a plant propagation source (e.g., a seed, a cutting, etc.), a price, a size (e.g., a height), a sender location, and/or a sender identifier—descriptive of a plant for sale. The system can then aggregate the set of characteristics to generate a listing (e.g., an advertisement) for the plant and post the sale listing for the plant to a platform. For example, the system can: access a set of characteristics descriptive of a plant corresponding to a plant for sale, aggregate the set of characteristics to generate a sale listing associated with a sender identifier corresponding to a sender of the plant featured in the sale listing; and populate a platform with the listing. Therefore, the system can generate a sale listing descriptive of a plant for sale and prompt a recipient to make an informed purchase about a plant based on a comprehensive description of the plant.

In one implementation, the system can implement computer vision techniques to extract features from an image of a plant to generate a sale listing. More specifically, the system can receive an indicator that a sender is creating a new sale listing for a plant. The system can then prompt the sender to upload content (e.g., a video, an image, etc.) of the plant. The system can access the content and implement computer vision techniques such as—object detection, panoptic segmentation, image classification, etc. —on the content to extract a set of characteristics (e.g., a plant type, a plant name, a foliage density, etc.) from the content and aggregate the set of characteristics into a sale listing. For example, the system can: access an image of a plant associated with a sale listing; implement a computer vision technique to identify a set of characteristics in the image descriptive of the plant; and aggregate the set of characteristics to generate a sale listing for the plant. Therefore, the system can reduce inaccuracies in identifying features (e.g., misnaming the plant, incorrectly counting the number of leaves, identifying a target climate, etc.) based on human error when using visual cues to describe a plant to generate a plant listing.

2.2.1 Image Quality Assessment

In one implementation, the system can generate an image quality metric descriptive of the plant featured in the image at the time the image is taken. More specifically, the system can access an image of a plant taken by a sender and extract image features to identify artifacts (e.g., blurriness, shading, etc.) in the image. The system can then generate a quality metric based on the artifacts descriptive of the quality of the image. For example, the system can generate a lower quality metric (e.g., "5", "3") when the system identifies more artifacts in the image and a higher quality metric (e.g., "7", "9") when the system identifies fewer artifacts in the image. The system can set a baseline quality metric for all plant images or a baseline quality metric for particular types of plants (e.g., a quality metric of "8" for rare plants, etc.). The system can compute a difference between the quality metric associated with the plant image and the baseline quality metric and identify whether the difference falls below a threshold difference or exceeds a threshold difference. For example, the system can: access a first image of a plant, generate a quality metric for the first image descriptive of a quality of the first image by extracting features from the image; compute a difference between the quality metric associated with the first plant image and a baseline quality metric; in response to the difference exceeding a difference threshold, generate a notification indicating that the first image is of poor quality and prompt access to a second image; and in response to the difference falling below the difference threshold, generating a sale listing based on the first image. Therefore, the system can prompt a sender to retake an image of the plant for the sale listing in order to increase quality of the listing and to provide an accurate representation of the plant to a potential recipient of the plant.

2.2.2 Plant Quality Assessment

In one implementation, the system can implement computer vision techniques on the plant images to generate a quality score of the plant in the image at the time that the image is taken. The quality score can be descriptive of the quality of the plant based on characteristics such as—wilted leaves, discoloration, etc. More specifically, the system can implement computer vision strategies to extract features from the image associated with the plant in the image to generate a feature vector descriptive of a set of features. The system can index each vector based on a particular feature for the plant consistently across images. The system can then generate a quality score—such as a number on a scale (e.g., 6 out of 10, etc.)—for the plant in the image based on the feature vector. The system can set a baseline plant quality score for comparison to the quality score of the plant in the retrieved image. In one variation, the system can set the baseline plant quality score for a recipient, such as—Recipient "1" prefers a plant quality score of "5 or higher", or Recipient "2" prefers a plant quality score of "9 or higher". The system can then compute a difference plant quality score between the baseline plant quality score and the quality score for the plant and identify whether the difference exceeds or falls below a threshold difference. For example, if the system generates a quality score of "3" for the plant in the image when the baseline plant quality score is a "7", the system can provide alternate listings to a recipient including higher quality scores. In one variation, the system can store the plant quality scores associated with a sender in a database and generate an average plant quality score for all sale listings associated with the sender. Therefore, the system can inform recipients of plants from a sender of an average plant quality that the sender generally provides.

For example, the system can: access a first image of a first plant for a first sale listing at a first time; implement a computer vision technique to extract a set of features from the first image; generate a first feature vector by aggregating the set of features into a vector, an index of the feature vector corresponding to a feature in the set of features in the first image; store the feature vector in a database associated with a sender identifier of the plant; generate a first quality score descriptive of a quality of the first plant in the first sale listing based on the first feature vector; compute a difference between the first quality score and a baseline quality score; in response to the difference exceeding a threshold quality score, retrieve a second sale listing associated with second quality score higher than the first quality score; and in response to the quality score falling below the target quality score, recommend a sale for the first plant listing. Therefore, the system can provide recommendations to users and push sales for plants that are of similar or higher quality than a target quality indicated by the user.

2.2.3 Demand-Based Adjustment

Additionally, or alternatively, the system can adjust a demand score of the sale listing based on the quality score associated for the listing and prices corresponding to other sale listings with similar feature vectors. More specifically, the system can access a set of feature vectors corresponding to a set of similar sale listings based on a criterion (e.g., a plant classification, a plant size, a leaf count, etc.) consistent across the set of sale listings. The system can implement a model to suggest a demand scheme of sale listings based on sale listings with a similar set of features and adjust a demand score of sale listings based on quality scores associated with the set of features. For example: the system can ingest a first image of a first plant for a first sale listing at a first time; extract a set of features descriptive of the first plant in the first image to generate a feature vector for the first sale listing; implement a model to generate a demand score based on quality scores corresponding to a set of sale listings exhibiting the set of features; adjust the demand score of the first sale listing according to the demand scheme. Thus, the system can translate the demand score into a local price range, or a price recommendation based on local currency, cost of living, etc. Therefore, the system can prompt a sender to adjust (e.g., increase, or decrease) a value of the sale listing based on demand schemes of other sale listings with similar features and quality scores to accurately reflect the value of the plant in the condition shown in the listing relative to other plants of similar quality.

2.3 Target-Plant Selection

In one implementation, a user (e.g., a recipient) can initiate a search of a target plant via the system. The system can aggregate information based on target plant characteristics selected by the user to identify a set of target plants. More specifically, the system can receive an input for a target plant based on a set of target characteristics and a location associated with the recipient. The set of target characteristics can include a size (e.g., a height), a plant type (e.g., a succulent, etc.), an ecology (e.g., a climate), a plant classification (e.g., a genus and species), a color, a leaf shape, a foliage density, a target quality score, a price range, etc. For example, the system can identify a houseplant, *Ficus lyrata* between 0.5 m to 1 m in height for average temperatures of 25 degrees Celsius as the target plant with an average quality score of "7". The system can further identify a current location (e.g., a location of recipient) and select a target distance range (e.g., 1 mile, 5 miles, 20 miles, etc.) from the current location to search for target plants. The system can then aggregate the target characteristics and the target location range into a target plant vector and store the target plant vector in a database.

For example, the system can: at a first time, access a first set of target characteristics descriptive of a first target plant for purchase; access a first location of a user and a first distance range associated with the first current location; and generate a first target vector including the first set of target characteristics and a first target location. The system can further: at a second time, access a second set of target characteristics descriptive of a second target plant for purchase; access a second location of the user; confirm that the first location of the user matches a second location of the user; and generate a second target vector including the second set of target characteristics and a second target location. Therefore, the system can identify a subset of target plants from the total set of plants on the platform for the user based on the indicated characteristics of interest to increase accuracy of generating suggestions for a user. Thus, the system can store the target characteristics in a profile associated with the recipient to select target plants at an increased accuracy during subsequent searches.

2.4 Target-Plant Identification

In one implementation, the system can query a set of sale listings periodically and generate a notification when a target plant exhibiting the target characteristics within the target distance range indicated by the target plant vector becomes available for sale. More specifically, the system can retrieve the target plant vector—including the set of target features and target distance range—and compare the target plant vector associated with the recipient with feature vectors associated with sale listings. In one variation, the system can compute a set of similarity scores between the target plant vector and a set of feature vectors for multiple sale listings to identify a set of sale listings with the closest match to the target plant. The system can then generate a recommendation for the set of sale listings and push a notification to a recipient when the target plant exhibiting the target characteristics within the target distance range becomes available. If the system detects that the recommended sale listing was ignored or rejected, the system can query the set of sale listings after an interval of time (e.g., 24 hours, etc.) to identify new sale listings that have been added.

For example, the system can: access the target plant vector including a set of target features and a target location range; identify a set of sale listings based on a set of similar features; compute a similarity score between the target plant vector and the set of feature vectors associated with the set of sale listings; in response to identifying that the similarity score exceeds a similarity score threshold, identify the sale listing corresponding to the feature vector, generate a notification that the target plant is available for purchase, provide the sale listing to the recipient; and in response to identifying that the similarity score falls below the similarity score threshold, generate a notification indicating that a target plant has not been identified based on the set of sale listings; and query the set of sale listings following a time interval. Therefore, the system can identify a target plant based on a set of features that are similar to the target set of features indicated by the recipient to push a sale of a plant in a compatible sale listing.

Additionally, or alternatively, the system can implement a feature space to identify similarities and differences between target plant vectors and feature vectors associated with sale listings. More specifically, the system can implement an n-dimensional feature space to map individual characteristics of the target plant vector and feature vectors for plant listings, and, based on spatial differences in the data, identify similarities in the characteristics to identify a target plant and push a recommendation for the target plant. For example, the system can: implement a feature space to compare the target plant vector with each feature vector corresponding to a sale listing to identify a sale listing that is most similar to the target plant characterized by the characteristics in the target plant vector; and in response to identifying the target plant for the set of sale listings, push a notification to the recipient that the target plant is available for purchase. Therefore, the system can generate comparisons of multiple features to provide a robust recommendation for a plant that most closely aligns with the target plant selected by the recipient.

2.5 Listing Update

In one implementation, the system can prompt the sender to update the sale listing when the system identifies that the date of an original sale listing is older than a threshold listing date. More specifically, the system can set a predetermined time threshold (e.g., 20 days, 1 week, etc.) from the date specified by the original sale listing after which to prompt the sender to update the original sale listing with new information (e.g., updated characteristics, an updated image, etc.). For example, the system can: identify a first date associated with a publication of the sale listing; identify a current date; calculate a date difference between the first date and the current date to identify a timeframe between the current date and first date; and in response to the date difference exceeding an age threshold, generating a notification to prompt a sender to update the sale listing with updated information specifying current plant characteristics. Therefore, the system can provide an accurate listing of plants to recipients that are representative of current plant conditions when time has elapsed since the original sale listing was initially published.

In one implementation, the system can prompt the sender to update the sale listing in response to generating a transaction trigger event. More specifically, in response to receiving an input of a purchase indication (e.g., addition of the item to a cart, entering of payment information, etc.), the system can generate a notification to the sender that a potential recipient has interest in purchasing the selected plant or that the recipient has initiated a transaction for the selected plant and to update the image corresponding to the listing. For example, the system can: monitor for a transaction trigger event; in response to receiving a transaction trigger event, generate an instruction to update an image of the plant in the plant listing; receive an updated image of the plant; and transmit the updated image of the plant to the recipient. Therefore, the system can provide a recipient with an accurate image of the plant at the time of an initiated transaction.

2.6 Post-Purchase Demand Score Adjustment

In one implementation, the system can notify the sender that the purchased plant has not been collected by the recipient within a pick-up window or that the recipient wants to return the purchase plant and generate a depreciation score based on the current condition of the plant. More specifically, the system can generate a notification and transmit the notification to the sender specifying that the purchased plant has not been picked up from the drop-off location for a time period since delivery to the drop-off location. Additionally, or alternatively, the system can generate a notification and transmit the notification to the sender specifying that the recipient would like to return the purchased plant for a refund. The system can receive a current image of the purchased plant and implement computer vision techniques (e.g., object detection, panoptic segmentation, etc.) to extract the set of characteristics (e.g., a foliage density, a leaf color, a leaf count, etc.) from the image and aggregate the set of characteristics into a vector with indices corresponding to a feature vector specifying characteristics during initial posting of the listing or accessed during the most recent listing update. The system can compute a second quality score descriptive of the quality of the plant based on the vector of characteristics. The system can then calculate a difference between the first quality score based on the first image retrieved during first publication of the listing, and the second quality score to generate a depreciation score of the plant representative of the depreciation of quality and condition of the plant since completion and fulfillment of the transaction.

For example, the system can: generate a notification specifying a refund request for a plant; receive a current image of the plant; extract the set of characteristics from the image based on a computer vision technique; compute a first quality score descriptive of the quality of the plant based on the set of characteristics; and compute a difference between the first quality score and second quality score characteristic of a quality of the plant during a time of purchase to generate a depreciation score. Therefore, the system can identify differences in plant quality and condition between purchase and delivery to appropriately associate a depletion in monetary value of the plant when a recipient wants to return the plant to the sender in a diminished condition.

In one variation, the system can translate the depreciation score into an adjusted (e.g., decreased) refund amount. More specifically, the system can correlate the depreciation score with a refund reduction value—such as a percent reduction from the sale price (e.g., 15%)—and translate the depreciation score into a reduced sale. For example, the system can: correlate the depreciation score to a refund reduction rate; and generate a target refund price based on the sale price less the refund reduction value. Therefore, the system can scale depreciation scores across plants with varying sale prices to consistently generate refund reduction prices.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
    during a first time period, in response to receiving a first request to generate a recipient profile from a recipient portal executing on a first mobile device accessed by a recipient:
        retrieving a series of geospatial data representing locations of the first mobile device during an initial time period preceding the first time period;
        deriving a grid of locations frequented by the recipient based on the series of geospatial data and storing the grid of locations in the recipient profile;
        accessing a population of hub profiles associated with a population of hubs, each hub, in the population of hubs, comprising a third-party retail location with storage space allocated to goods:
            transacted between local recipients and local senders; and
            distinct from goods sold at the third-party retail location;
        for each hub, in the population of hubs,
            accessing a hub location, in a population of hub locations, stored in a hub profile, in the population of hub profiles, associated with the hub; and
            in response to the hub location falling within a threshold distance of the grid of locations, storing the hub in a set of hubs associated with locations proximal the grid of locations;
        serving the set of hubs to the recipient via the recipient portal;
        in response to receiving selection of a particular hub, in the set of hubs, from the recipient via the recipient portal, assigning the particular hub as a default recipient hub for the recipient; and
        associating the default recipient hub with the recipient profile;
    during a second time period, in response to receiving a second request to list a first good from a sender portal executing on a second mobile device accessed by a first sender:
        generating a first listing for the first good, offered by the first sender, within an online marketplace hosting a population of listings;
        accessing a default sender hub, in the population of hubs, stored in a sender profile, in a population of sender profiles, associated with the first sender;
        associating the first listing with the default sender hub; and
        publishing the first listing to the online marketplace; and
    during a third time period succeeding the second time period, in response to receiving a third request for listings from the recipient via the recipient portal:
        filtering the population of listings to aggregate a first subset of listings associated with default sender hubs matched to the default recipient hub, the first subset of listings comprising the first listing;
        presenting the first subset of listings to the recipient via the recipient portal; and
        in response to receiving confirmation of a purchase of the first good by the first recipient via the first listing presented to the recipient within the recipient portal:
            generating a first electronic order comprising a first sender prompt to deliver the first good to the default sender hub within a fourth time period succeeding the third time period;
            transmitting the first electronic order, comprising the first sender prompt, to the first sender via the sender portal;
            generating a first electronic ticket comprising a first hub prompt to store the first good and to release the first good to the first recipient;
            transmitting the first electronic ticket, comprising the first hub prompt, to the default sender hub via a hub portal executing on a third mobile device accessed by a user affiliated with the hub;
            generating a first electronic receipt comprising a first recipient prompt to accept delivery of the first good at the default sender hub within a fifth time period succeeding the fourth time period; and
            serving the first electronic receipt, comprising the first recipient prompt, to the recipient via the recipient portal.

2. The method of claim 1:
    wherein generating the first listing comprises generating the first listing for the first good comprising a potted houseplant;
    wherein associating the first listing with the default sender hub comprises associating the first listing with the default sender hub comprising a coffee shop; and
    wherein generating the first electronic ticket comprises generating the first electronic ticket comprising the first hub prompt to store the potted houseplant in a storage area, at the default sender hub, and exposed to natural light.

3. The method of claim 1:
further comprising accessing a maximum storage duration of goods temporarily stored at the default sender hub, transacted between local recipients and local senders, and distinct from goods sold by at the third-party retail location;
wherein generating the first electronic order comprises generating the first sender prompt to deliver the first good to the default sender hub prior to a latest delivery date; and
wherein generating the first electronic receipt comprises:
calculating a latest pickup date based on the latest delivery date and the maximum storage duration; and
generating the first recipient prompt to pick up the first good prior to the latest pickup date.

4. The method of claim 1:
further comprising accessing a first set of good characteristics of the first good; and
wherein accessing the default sender hub in response to receiving the second request comprises:
accessing a second set of locations accessible to the first sender;
identifying a second set of hubs, in the population of hubs, proximal the second set of locations, each hub in the population of hubs comprising the third-party retail location further associated with supported good characteristics of goods transacted between local recipients and local senders and temporarily stored at each hub;
isolating a subset of hubs, in the second set of hubs, associated with supported good characteristics comprising the first set of good characteristics;
in response to receiving selection of a hub, in the subset of hubs, from the first sender via the sender portal:
assigning the hub as the default sender hub for the first sender; and
associating the default sender hub with the sender profile; and
in response to receiving the second request, accessing the default sender hub stored in the sender profile.

5. The method of claim 4:
wherein accessing the first set of good characteristics comprises accessing the first set of good characteristics comprising a foodstuff class of the first good and a refrigeration requirement of the first good; and
wherein isolating the subset of hubs comprises filtering the second set of hubs for hubs associated with refrigeration and foodstuff storage.

6. The method of claim 4:
further comprising, during a sixth time period preceding the first time period:
receiving a request to generate a first hub profile from a first merchant;
in response to receiving the request:
initializing a first hub survey comprising a set of information requests for storage capacity, supported good characteristics, and hub locations;
serving the survey to the first merchant via the hub portal;
extracting a first set of hub characteristics from data entered into the survey by the first merchant, the first set of hub characteristics comprising a first hub location;
populating the first hub profile with the first set of hub characteristics; and
storing the first hub profile in the population of hub profiles representing the population of hubs; and
wherein identifying the second set of hubs comprises identifying the second set of hubs:
proximal the second set of locations based on hub locations stored in hub profiles in the population of hub profiles;
associated with supported good characteristics, specified in hub profiles in the population of hub profiles, matched to the first set of good characteristics of first good; and
exhibiting available store capacity, specified in hub profiles in the population of hub profiles, to store the first good.

7. The method of claim 1, further comprising:
during the first time period:
assigning a secondary recipient hub, selected from the set of hubs, to the recipient;
during a sixth time period:
generating a second listing, for a second good offered by a second sender, within the online marketplace hosting the population of listings; and
associating the second listing with a second default sender hub in the population of hubs; and
during a seventh time period, succeeding the fourth sixth time period, in response to receiving a fourth request for listings from the recipient via the recipient portal:
filtering the population of listings to aggregate a second subset of listings associated with default sender hubs intersecting the default recipient hub and the secondary recipient hub, the second subset of listings comprising the second listing;
presenting the second subset of listings to the recipient via the recipient portal; and
in response to the recipient purchasing the second good via the second listing:
generating a second electronic order comprising a second sender prompt to deliver the second good to the second default sender hub;
transmitting the second electronic order to the second sender via the sender portal;
generating a second electronic ticket comprising a second hub prompt to store the second good and to release the second good to the recipient;
transmitting the second electronic ticket to the second default sender hub via the hub portal;
generating a second electronic receipt comprising a second recipient prompt to accept delivery of the second good at the second default sender hub; and
transmitting the second electronic receipt to the first recipient via the recipient portal.

8. The method of claim 1, further comprising:
during a fourth time period, in response to receiving a fourth request to list a second good from the first sender via the sender portal:
generating a second listing, for the second good offered by the first sender, within the online marketplace; and
associating the second listing with the default sender hub and a secondary sender hub, in the population of hubs, selected by the first sender; and
during a fifth time period succeeding the fourth time period, in response to receiving a fifth request for listings from the recipient via the recipient portal:
filtering the population of listings to aggregate a second subset of listings associated with default sender hubs corresponding to the default recipient hub, the second subset of listings comprising the second listing associated with the default sender hub and the secondary sender hub;
presenting the second subset of listings to the recipient via the recipient portal; and
in response to the recipient purchasing the second good via the second listing:
generating a second electronic order comprising a second sender prompt to deliver the second good to the default recipient hub;
transmitting the second electronic order to the first sender via the sender portal;
generating a second electronic ticket comprising a second hub prompt to store the second good and to release the second good to the recipient;
transmitting the second electronic ticket to the default recipient hub via the hub portal;
generating a second electronic receipt comprising a second recipient prompt to accept delivery of the second good at the default recipient hub; and
transmitting the second electronic receipt to the recipient via the recipient portal.

9. The method of claim 1:
wherein deriving the grid of locations frequented by the recipient comprises:
interpreting a first set of locations from a set of calendar events, spanning a target future time period, stored in a calendar associated with the recipient;
interpreting a second set of locations frequented by the recipient based on the series of geospatial data; and
deriving the grid of locations based on the first set of locations and the second set of locations.

10. The method of claim 1:
wherein presenting the first subset of listings to the recipient comprises:
populating an interactive map with the first subset of listings based on hub locations of default sender hubs associated with the first subset of listings; and
serving the interactive map to the recipient via the recipient portal.

11. The method of claim 1, further comprising, during the third time period:
in response to receiving confirmation of the purchase:
receiving of funds for the purchase of the first good from the recipient via the recipient portal; and
storing the transaction amount in a recipient trust account; and
in response to receiving confirmation of the recipient at the default sender hub:
generating a good confirmation request comprising a second recipient prompt to confirm a condition of the first good according to the first listing;
serving the good confirmation request to the recipient via the recipient portal;
generating a hub confirmation request comprising a second hub prompt to confirm release of the first good from the default sender hub;
serving the hub confirmation request to the default sender hub via the hub portal; and
in response to receiving a first confirmation of the good confirmation request, from the recipient via the recipient portal, and receiving a second confirmation of the hub confirmation request from the default sender hub via the hub portal, releasing funds for the purchase of the first good from the recipient trust account to a sender trust account associated with the first sender.

12. The method of claim 1, wherein deriving the grid of locations based on the series of geospatial data comprises:
extracting a first set of locations frequented by the recipient during the initial time period based on the series of geospatial data;
accessing a calendar associated with the recipient and defining a set of calendar events spanning a future time period of a target duration;
extracting a second set of locations associated with the set of calendar events; and
deriving the grid of common locations associated with the recipient based on the first set of locations and the second set of locations.

13. The method of claim 1, further comprising, during the third time period, in response to receiving the third request for listings from the recipient via the recipient portal:
filtering the population of listings to aggregate a second subset of listings associated with default sender hubs differing from the default recipient hub, the first subset of listings comprising a second listing corresponding to a second good offered by a second sender and associated with a second default recipient hub;
presenting the second subset of listings to the recipient via the recipient portal; and
in response to receiving confirmation of a second purchase of the second good by the recipient via the second listing:
generating a second electronic order comprising a second sender prompt to deliver the second good to the second default sender hub;
serving the second electronic order to the second sender;
generating a second electronic ticket comprising a second hub prompt to store the second good and to release the second good to a first transport;
serving the second electronic ticket to the second default sender hub;
generating a third electronic order comprising a second transport prompt to pick up the second good at the second default sender hub and to deliver the second good to the default recipient hub;
serving the third electronic order to the first transport;
generating a third electronic ticket comprising a second hub prompt to store the second good and to release the second good to the recipient;
serving the third electronic ticket to the default recipient hub;
generating a second electronic receipt comprising a second recipient prompt to accept delivery of the second good at the default recipient hub; and
serving the second electronic receipt to the recipient.

14. A method comprising:
during a first time period:
accessing a first set of locations frequented by a first recipient;
identifying a first set of hubs, in a population of hubs, proximal the first set of locations, each hub in the population of hubs comprising a third-party retail location with storage space allocated to goods transacted between local recipients and local senders and distinct from goods sold by the third-party retailer; and
assigning a first recipient hub, selected from the first set of hubs, to the first recipient;

during a second time period:
    generating a first listing, for a first good offered by a first sender, within an online marketplace hosting a population of listings; and
    associating the first listing with a default sender hub, in the population of hubs;
during a third time period succeeding the second time period:
    filtering the population of listings to aggregate a first subset of listings associated with default sender hubs differing from the default recipient hub and, the first subset of listings comprising the first listing;
    presenting the first subset of listings to the first recipient via a first instance of a recipient portal associated with the first recipient; and
    in response to the first recipient purchasing the first good via the first listing:
        generating a first electronic order comprising a first sender prompt to deliver the first good to the default sender hub;
        serving the first electronic order to the first sender via a sender portal associated with the first sender;
        generating a first electronic ticket comprising a first hub prompt to store the first good and to release the first good to a first transport;
        serving the first electronic ticket to the default sender hub via a first instance of a hub portal associated with a first merchant associated with the default sender hub;
        generating a second electronic order comprising a first transport prompt to pick up the first good at the default sender hub and to deliver the first good to the first recipient hub;
        serving the second electronic order to the first transport via a transport portal associated with the first transport;
        generating a second electronic ticket comprising a second hub prompt to store the first good and to release the first good to the first recipient;
        serving the second electronic ticket to the first recipient hub via a second instance of the hub portal associated with a second merchant associated with the first recipient hub; and
        generating a first electronic receipt comprising a first recipient prompt to accept delivery of the first good at the first recipient hub; and
        serving the first electronic receipt to the first recipient via the first instance of the recipient portal;
during a fourth time period:
    accessing a second set of locations frequented by a second recipient;
    identifying a second set of hubs, in the population of hubs, proximal the second set of locations; and
    assigning a second recipient hub, selected from the second set of hubs, to the second recipient;
during a fifth time period:
    generating a second listing, for a second good offered by the first sender, within the online marketplace; and
    associating the second listing with the default sender hub; and
during a sixth time period succeeding the fifth time period:
    filtering the population of listings to aggregate a second subset of listings associated with default sender hubs matched to the second recipient hub, the second subset of listings comprising the second listing;
    presenting the second subset of listings to the second recipient via a second instance of the recipient portal associated with the second recipient; and
    in response to the second recipient purchasing the second good via the second listing:
        generating a third electronic order comprising a second sender prompt to deliver the second good to the default sender hub;
        serving the third electronic order to the sender;
        generating a third electronic ticket comprising a second hub prompt to store the second good and to release the second good to the second recipient;
        serving the third electronic ticket to the default sender hub;
        generating a second electronic receipt comprising a second recipient prompt to accept delivery of the second good at the second recipient hub; and
        serving the second electronic receipt to the second recipient via the second instance of the recipient portal.

15. The method of claim 14:
wherein accessing the first set of locations frequented by the first recipient comprises aggregating a series of geospatial locations of a mobile device associated with the first recipient over an initial time period preceding the first time period from a location database into a grid of common locations; and
wherein identifying the first set of hubs comprises isolating the first set of hubs from the population of hubs, the first set of hubs associated with geospatial locations within a threshold proximity from the grid of common locations.

16. The method of claim 14, further comprising, during the third time period:
filtering the population of listings to aggregate a second subset of listings associated with default sender hubs differing from a default second recipient hub and, the second subset of listings comprising a second listing;
presenting the second subset of listings to a third recipient via the online marketplace portal; and
in response to the third recipient purchasing the second good, via the second listing:
    accessing a database of transports associated with the default sender hub;
    identifying a first transport, in the population of transports, scheduled to deliver the first good prior to a latest delivery time associated with the second listing, the first good associated with the default sender hub;
    generating a third electronic order comprising a second transport prompt to pick up the second good at the default sender hub and to deliver the second good to the default second recipient hub; and
    serving the second electronic order to the first transport.

17. A method comprising:
during a first time period, in response to receiving a first request to list a first good from a sender portal executing on a first mobile device accessed by a sender:
    initializing a first listing for the first good, offered by the sender, within an online marketplace hosting a population of listings;
    accessing an image of the first good provided by the sender via the sender portal;
    extracting a first set of good characteristics of the first good based on features extracted from the first image;

accessing a set of sender locations associated with the sender;

generating a first feature vector associated with the first good based on the first set of good characteristics and the set of sender locations;

deriving a first quality score for the first good based on the first set of good characteristics;

populating the first listing with the first quality score and the first set of good characteristics; and publishing the first listing to the online marketplace; and during a second time period succeeding the first time period, in response to receiving a second request for a target good from a recipient portal executing on a second mobile device accessed by a recipient:

accessing a set of target good characteristics of the target good defined by the recipient;

accessing a set of recipient locations associated with the recipient;

generating a second feature vector associated with the target good based on the set of target good characteristics and the set of recipient locations;

characterizing a difference between the first feature vector and the second feature vector;

in response to the difference falling below a threshold difference, serving the first listing for the first good to the recipient via the recipient portal;

in response to a first purchase of the first good by the recipient via the first listing:

accessing a population of hub profiles associated with a population of hubs each hub, in the population of hubs, comprising a third-party retail location with storage space allocated to goods transacted between recipients and senders and distinct from goods sold at the third-party retail location, each hub profile, in the population of hub profiles, specifying a hub location, in a population of hub locations, of the hub;

selecting a first hub, in the populations of hubs, for storage of the first good based on the first set of good characteristics, the sender location, and the recipient location;

generating a first notification indicating confirmation of the first purchase and comprising a sender prompt to deliver the first good to the first hub during a third time period;

transmitting the first notification to the sender via the sender portal;

generating a second notification comprising a hub prompt to store the first good and to release the first good to the recipient;

transmitting the second notification to a merchant associated with the first hub via a hub portal executing on a third mobile device accessed by the merchant;

generating a third notification indicating confirmation of the first purchase and comprising a recipient prompt to accept delivery of the first good at the first hub during a fourth time period succeeding the third time period; and transmitting the third notification to the recipient via the recipient portal.

18. The method of claim 17:

wherein initializing the first listing for the first good comprises initializing the first listing for the first good comprising a potted houseplant;

wherein extracting the first set of good characteristics based on features extracted from the first image comprises extracting the first set of good characteristics based on features extracted from the first image, the first set of good characteristics comprising a plant type and a plant size; and wherein accessing the set of target good characteristics defined by the recipient comprises accessing the set of target good characteristics defined by the recipient and comprising a target plant type and a target plant size of a target plant specified by the recipient in the second request.

19. The method of claim 17:

wherein accessing the set of sender locations associated with the sender comprises:

retrieving a first series of geospatial data representing locations of the first mobile device during a fifth time period preceding the first time period; and deriving the set of sender locations, frequented by the recipient, based on the first series of geospatial data; and wherein accessing the set of recipient locations associated with the recipient comprises:

retrieving a second series of geospatial data representing locations of the second mobile device during a sixth time period preceding the second time period; and deriving the set of sender locations, frequented by the recipient, based on the second series of geospatial data.

\* \* \* \* \*